US006604137B2

(12) United States Patent
Cowan et al.

(10) Patent No.: US 6,604,137 B2
(45) Date of Patent: Aug. 5, 2003

(54) SYSTEM AND METHOD FOR VERIFICATION OF REMOTE SPARES IN A COMMUNICATIONS NETWORK WHEN A NETWORK OUTAGE OCCURS

(75) Inventors: Daniel Edward Cowan, Colorado Springs, CO (US); Gerard Lawrence Commerford, Jr., Colorado Springs, CO (US); Barbara A. Paul, Colorado Springs, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/903,609

(22) Filed: Jul. 31, 1997

(65) Prior Publication Data

US 2001/0039574 A1 Nov. 8, 2001

(51) Int. Cl.[7] .............................................. G06F 15/173
(52) U.S. Cl. ...................... 709/224; 709/223; 709/242; 370/216; 707/1; 714/2; 714/4
(58) Field of Search ................................ 709/223, 224, 709/220, 105, 221, 242, 244, 239; 379/10, 15, 16; 370/216, 221, 241, 242, 243, 244, 245, 254, 217, 218, 219, 220, 222; 714/1, 2, 3, 4, 25; 707/10, 1, 204, 100

(56) References Cited

U.S. PATENT DOCUMENTS

| | | | | |
|---|---|---|---|---|
| 5,058,105 A | * | 10/1991 | Mansour et al. | 370/228 |
| 5,146,452 A | * | 9/1992 | Pekarske | 370/218 |
| 5,412,376 A | * | 5/1995 | Chujo et al. | 340/2.1 |
| 5,495,471 A | * | 2/1996 | Chow et al. | 370/221 |
| 5,537,532 A | * | 7/1996 | Chng et al. | 714/4 |
| 5,706,276 A | * | 1/1998 | Arslan et al. | 340/2.2 |
| 5,748,098 A | * | 5/1998 | Grace | 340/3.41 |
| 5,751,933 A | * | 5/1998 | Dev et al. | 714/4 |
| 5,761,429 A | * | 6/1998 | Thompson | 709/224 |
| 5,777,549 A | * | 7/1998 | Arrowsmith et al. | 340/506 |
| 5,781,535 A | * | 7/1998 | Russ et al. | 370/248 |
| 5,793,760 A | * | 8/1998 | Chopping | 370/355 |
| 5,796,718 A | * | 8/1998 | Caterisano | 370/217 |
| 5,809,286 A | * | 9/1998 | McLain, Jr. et al. | 703/23 |
| 5,845,081 A | * | 12/1998 | Rangarajan et al. | 709/224 |
| 5,859,959 A | * | 1/1999 | Kimball et al. | 370/216 |
| 5,887,127 A | * | 3/1999 | Saito et al. | 714/4 |
| 5,896,440 A | * | 4/1999 | Reed et al. | 379/1 |
| 5,920,257 A | * | 7/1999 | Commerford | 340/506 |
| 5,920,542 A | * | 7/1999 | Henderson | 370/217 |
| 5,937,036 A | * | 8/1999 | Dean et al. | 379/44 |
| 5,937,042 A | * | 8/1999 | Sofman | 379/113 |
| 5,941,955 A | * | 8/1999 | Wilby et al. | 709/242 |
| 5,943,321 A | * | 8/1999 | St-Hilaire et al. | 370/259 |
| 5,991,263 A | * | 11/1999 | Bales et al. | 370/225 |
| 5,991,814 A | * | 11/1999 | Rzonca et al. | 709/237 |
| 5,996,001 A | * | 11/1999 | Quarles et al. | 709/203 |
| 6,011,780 A | * | 1/2000 | Vaman et al. | 370/237 |
| 6,012,150 A | * | 1/2000 | Bartfai et al. | 714/4 |
| 6,014,567 A | * | 1/2000 | Budka | 455/422 |

(List continued on next page.)

OTHER PUBLICATIONS

Stevens, "TCP/IP Illustrated, vol. 1", Addison–Wesley pp. 359–362 & 373, 1994.*

Primary Examiner—Mark R. Powell
Assistant Examiner—William C. Vaughn, Jr.

(57) ABSTRACT

A system and method are disclosed for verifying spare capacity in a communications network comprising a database containing the configuration of switching elements within the network and a plurality of instructions resident on a memory device for operating a control computer, wherein the plurality of instructions includes a code segment for generating alarms on the switching elements, a code segment for receiving the alarms from the switching elements, and a code segment for updating the database to reflect the spare capacity based upon the alarms.

21 Claims, 13 Drawing Sheets

U.S. PATENT DOCUMENTS

| | | | |
|---|---|---|---|
| 6,018,576 A * | 1/2000 | Croslin | 379/221 |
| 6,032,203 A * | 2/2000 | Heidhues | 710/11 |
| 6,044,075 A * | 3/2000 | Le Boudec et al. | 370/234 |
| 6,047,331 A * | 4/2000 | Medard et al. | 709/239 |
| 6,049,523 A * | 4/2000 | Anderson et al. | 370/217 |
| 6,057,757 A * | 5/2000 | Arrowsmith et al. | 340/506 |
| 6,108,300 A * | 8/2000 | Coile et al. | 370/217 |
| 6,112,015 A * | 8/2000 | Planas et al. | 345/735 |
| 6,112,249 A * | 8/2000 | Bader et al. | 709/239 |
| 6,122,759 A * | 9/2000 | Ayanoglu et al. | 714/57 |
| 6,141,319 A * | 10/2000 | Dighe et al. | 370/218 |
| 6,205,117 B1 * | 3/2001 | Doshi et al. | 370/225 |
| 6,205,563 B1 * | 3/2001 | Lewis | 709/223 |
| 6,212,581 B1 * | 4/2001 | Graf | 710/18 |
| 6,215,867 B1 * | 4/2001 | Eslambolchi | 370/221 |
| 6,282,170 B1 * | 8/2001 | Bentall et al. | 370/225 |
| 6,373,383 B1 * | 4/2002 | Arrowsmith et al. | 340/506 |

* cited by examiner

SYSTEM AND METHOD FOR VERIFICATION OF REMOTE SPARES IN A COMMUNICATIONS NETWORK WHEN A NETWORK OUTAGE OCCURS

TECHNICAL FIELD OF THE INVENTION

This invention relates, in general, to the restoration of network information systems, and in particular to, a system and method for real-time verification of spare capacity in a communications network to minimize failures during the implementation of restoration routes following a network outage.

BACKGROUND OF THE INVENTION

Without limiting the scope of the present invention, the background is described in connection with telecommunication networks.

Telecommunication networks serve a vital role in both the public and private sectors. For example, businesses and individuals rely on these sophisticated networks to transport information, both voice and data, from one location to another. Of particular importance to both businesses and individuals is the reliability and cost of communicating via the telecommunications infrastructure. For example, if an outage occurs within a telecommunication network, vast amounts of information may be lost, coupled with the substantial costs associated therewith.

Network outages develop when a discontinuity occurs within the network architecture. A discontinuity within the network may result for reasons such as, a natural disaster, accidental or intentional human intervention, or faulty network components. Regardless of the cause of the network outage, however, the communication within the network must be restored as promptly as possible to avoid unnecessary and costly disruptions in communication.

Presently, restoration of communications service is implemented by selecting alternate routes within the network which are not effected by the outage. Typically, a restoration pre-plan is used. These pre-plans are developed from network topology information which is periodically gathered and stored. It has been found, however, that due to the rapid and continuous nature of changes to the architecture of networks, the data used to prepare the pre-plans and therefore the pre-plans themselves may be obsolete before they are implemented. When a pre-plan is unsuccessful, an audit of the network architecture is required to develop a new restoration plan. This ad-hoc approach to restoration of communications, however, has been found to take an unacceptably long period of time.

Therefore, a need has arisen for a reliable, efficient and cost effective method for restoring communication after a network outage occurs. A need has also arisen for a system and method of real-time verification of remote spares in a communications network. Further, a need has arisen for a system and method for dynamically generating restoration routes following an outage, based upon accurate spare capacity information.

SUMMARY OF THE INVENTION

The present invention disclosed herein comprises a system and method that reliably, efficiently and cost effectively restores communication within a network after a network outage has occurred. The system and method of the present invention provides real-time verification of spare capacity, thereby allowing for dynamic generation of restoration routes following an outage based upon accurate spare capacity information minimizing failed restoration routes.

The system and method of the present invention comprises a database comprising the configuration of switching elements within a network and a plurality of instructions resident on a memory device for operating a control computer. The database includes individual partitions corresponding to each of the switching elements which are updated in real-time such that each partition reflects the current configuration of the corresponding switching element within the network.

The plurality of instructions are resident on a memory device of a control computer. The system and method of the present invention generates a first set of alarms on the switching elements and receives these alarms from the switching elements. The system and method of the present invention also generates a first set of commands to clear the alarms from the switching elements. During this process, the system and method of the present invention distinguishes between alarms intentionally generated and other alarms generated within the network. As the alarms and the alarm clears are received, a database is generated, compared with and used to for updating the database containing the configuration of switching elements.

The system and method of the present invention may also generate additional sets of alarms on the switching elements and additional sets of commands to clear these alarms to further assure the accuracy of the process.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific exemplary contexts. The specific embodiments discussed herein are merely illustrative of specific ways to make and use the invention, and do not limit the scope of the invention.

Figure 1:
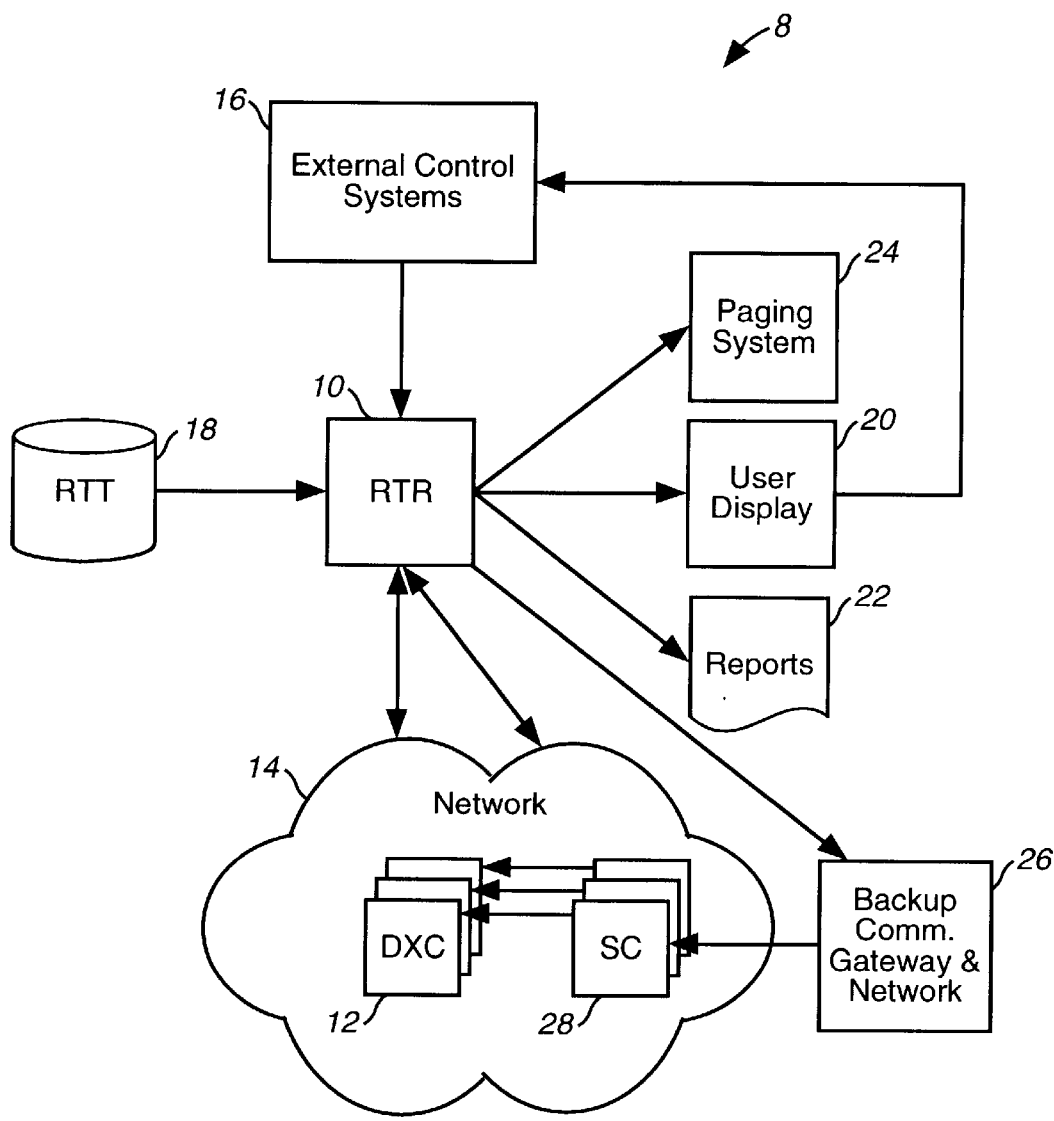
FIG. 1 is an architectural diagram depicting a network restoration system of the present invention.

Referring now to FIG. 1, a high level network restoration architectural diagram illustrating the use of the present invention is shown and denoted generally as 8. Real time restoration (RTR) 10 is a software application that may be implemented on a high-performance midrange computer, such as, but not limited to, a DEC Alpha running with an Open VMS or VMS operating system. Alternatively, RTR 10 may be implemented on other types of computers or on multiple computers in a distributed architecture. It is also desirable to have two or more redundant, remotely located RTR 10 systems, one running as primary and the others as backup, for survivability purposes. RTR 10 is designed to accommodate this functionality with automated execution state designations, as will be described later.

The restoration network 8 may be implemented within a telecommunications network 14 with a plurality of network switching elements, such as a Digital Cross-Connect (DXC) 12. DXC 12 may be used to reroute information carrying lines in the event of an outage. Switching is performed based on commands generated and provided by RTR 10.

Network 14, which may be a protocol specific network, is used to transmit RTR 10 commands to each DXC 12. The network 14 is also used to transmit command responses and alarms, generated by the DXC 12, to RTR 10. Other means for communications through the network 14 between the RTR 10 and the DXC 12 may be used.

RTR 10 has an interface with one or more external control systems 16. These external control systems 16 represent any system or collection of systems that are used to create, store, and upload restoration pre-plans; provide a means for user input, such as selection of restoration mode (dynamic or pre-plan) and selection of pre-plans; and provide a means for user display of data. For example, user input to the RTR 10 may be achieved through a personal computer (PC) or workstation (WS). Other automated input, such as restoration pre-plans, may be through another computer, such as an IBM mainframe.

It is possible to realize external control systems 16 on the same computer as RTR 10. The RTR 10 may interface with external control systems 16 on the same computer as RTR 10 via messaging to and from internal VMS mailboxes. Alternatively, the RTR 10 may interface with external control systems 16 on other computers, by way of DECNet messaging, when RTR 10 is implemented on a DEC Alpha computer.

RTR 10 also receives input from a real-time topology (RTT) database 18. RTT 18 includes data on the topology of network 14 including all components and trunks of network 14. This data is updated in real-time, so as to reflect the most current state of the network 14. RTR 10 is only interested in topology data as it pertains to a physical restoration network 14. Therefore, some processing is required within RTR 10 to extract and properly represent the data that is relevant to restoration. This will generally include data on DXC 12 devices and their inter connectivity.

Since RTT 18 includes data on all network 14 topology, it is typically stored and maintained external to RTR 10, as it has many purposes and uses independent of RTR 10. RTR 10 is designed to use data from RTT 18, for convenience of use, and to keep an internal store of select data relevant to restoration. This internal store of restoration data will be described later, in reference to FIG. 3 and FIG. 5.

RTR 10 is designed with a means for presenting results of restoration, and other data, to the user via a user display 20. This user display 20, which may be a graphical user interface (GUI), can be on the same computer as the external control system 16 for user input, which is generally a PC. This is conducive for purposes such as providing the user with a list of restoration options, then accepting the user's selection of an option.

Thus, while FIG. 1 shows the logical breakdown of components based on functionality, many functions, such as user display 20 and user input 16, may be realized on the same computer. Typically, other external control systems 16, such as development and maintenance of pre-plans, are realized on a different computer for performance reasons. However, it is possible to realize all external control systems 16 on a single computer.

RTR 10 is also designed with a means for producing reports 22. These reports 22 detail the results of restoration, error messages, other system messages, and other data desired by the user. Reports 22 may be customized to the user's needs. RTR 10 provides the means and data for generating such reports 22.

RTR 10 is also designed with a means for issuing a page to a developer if certain error messages are produced within RTR 10. An interface to a paging system 24 provides the means for delivering the page.

RTR 10 may also include a backup communications system with the DXCs 12. While network 14 provides primary communications through a pair of redundant binary data links to each DXC 12, a backup communications gateway and network 26 may be used to communicate with each DXC 12 in the event that primary communications fail. The backup communications gateway and network 26 provides data links to each DXC 12 by way of a site controller (SC) 28, one of which is located at each DXC 12 site. When RTR 10 detects failure in the primary communications, RTR 10 automatically shifts to the backup communications to reach the DXCs 12.

Using the architecture shown in FIG. 1, RTR 10 can support both a pre-plan and a dynamic restoration methodology on a common system platform. For a pre-plan methodology, pre-plans are developed on an external control system 16, such as an IBM mainframe. Pre-plans are then downloaded to another external control system 16, such as a PC.

When RTR 10 detects a network outage, it notifies the user through the user display 20 which may be a PC. The user may then select to utilize a pre-plan, or utilize dynamic restoration. If the user selects a pre-plan, the PC uploads that pre-plan to RTR 10, which proceeds to implement it. To implement a pre-plan, RTR 10 reads the actions from the pre-plan, which are stored in a generic format in a file, translates these actions to actual DXC 12 commands, and issues these commands to the DXC 12. Results of the pre-plan implementation are then provided to the user display 20. If the user selects dynamic restoration, RTR 10 proceeds to generate a restoral route dynamically. RTR 10 then implements that restoral route by issuing commands to the DXC 12 devices, and notifies the user of results.

Figure 2:
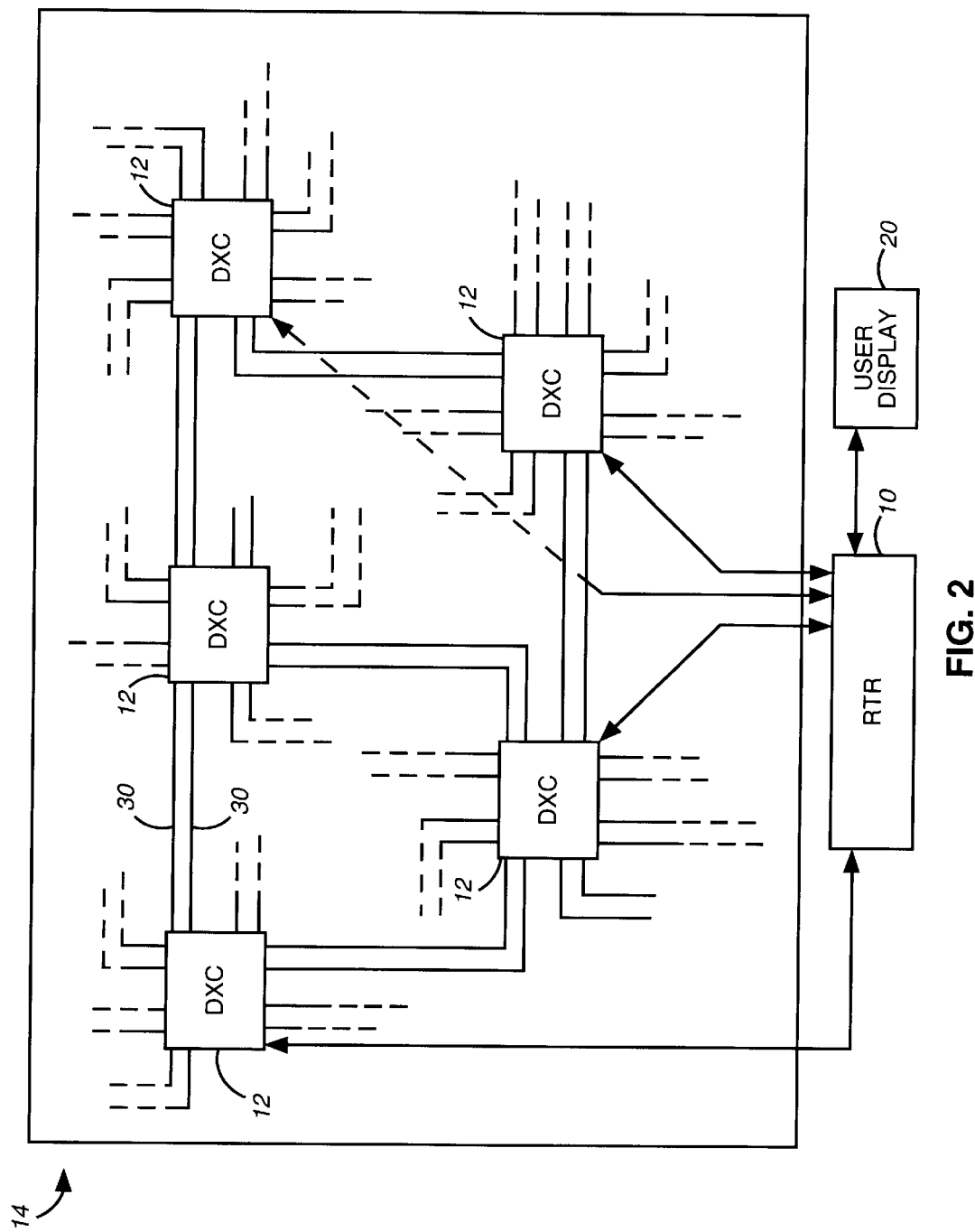
FIG. 2 is a schematic illustration of a typical network architecture.

Referring now to FIG. 2, a high level depiction of a network architecture comprising network elements 12 is depicted and denoted generally as 14. Network 14 includes of a plurality of network elements, such as DXCs 12. The DXCs 12 within FIG. 2 can be bi-directional switching elements that are used to route information to a predetermined destination. For example, digital data, such as information distributed to and from LAN or WAN, digital voice data, such as telephone communication, and digital images, such as video conferencing. The DXCs 12 within a network 14 are memory resident within a logical topology, i.e., information concerning the configuration of each device is resident within memory of the RTT 18 database. The RTR 10 in FIG. 2, with the aid of the RTT 18 logical topology, is capable of determining the most efficient and cost effective route for restoration of service to the customer. The RTR 10 is only concerned with the RTR 18 topology that is available for restoration of traffic.

Information travels between two DXC 12 on trunk segments 30. Data flows in either direction down each trunk segment 30 with a predetermined destination. The DXCs 12 are capable of re-routing network data based on instructions from the RTR 10 and information associated with data that travel through the network 14. The destination routes for data are determined based on information regarding data type and destination.

Network communication problems usually occur when a disruption occurs within trunk segment 30. For example, segment 30 of network 14 could be disrupted due to a natural disaster, such as lightning striking a control center or from accidents caused by operating heavy equipment around trunk segment 30 which tears through trunk segment 30. Once service has been disrupted, DXCs 12 associated with the trunk segments 30 that are affected will be isolated and a restoration route is initiated by a pre-plan restoration route or by dynamically generating a restorable route with the RTR 10 in the most efficient and cost effective manner.

An alarm is generated by DXCs 12 when, among other things, a discontinuity or outage occurs within a trunk segment 30. The RTR 10 determines the validity of the alarm and the DXCs 12 generating the alarm to isolate the effected segments 30 and identify alternate routes to restore service. Factors effecting restoration lie within the boundaries of availability and costs.

Figure 3:
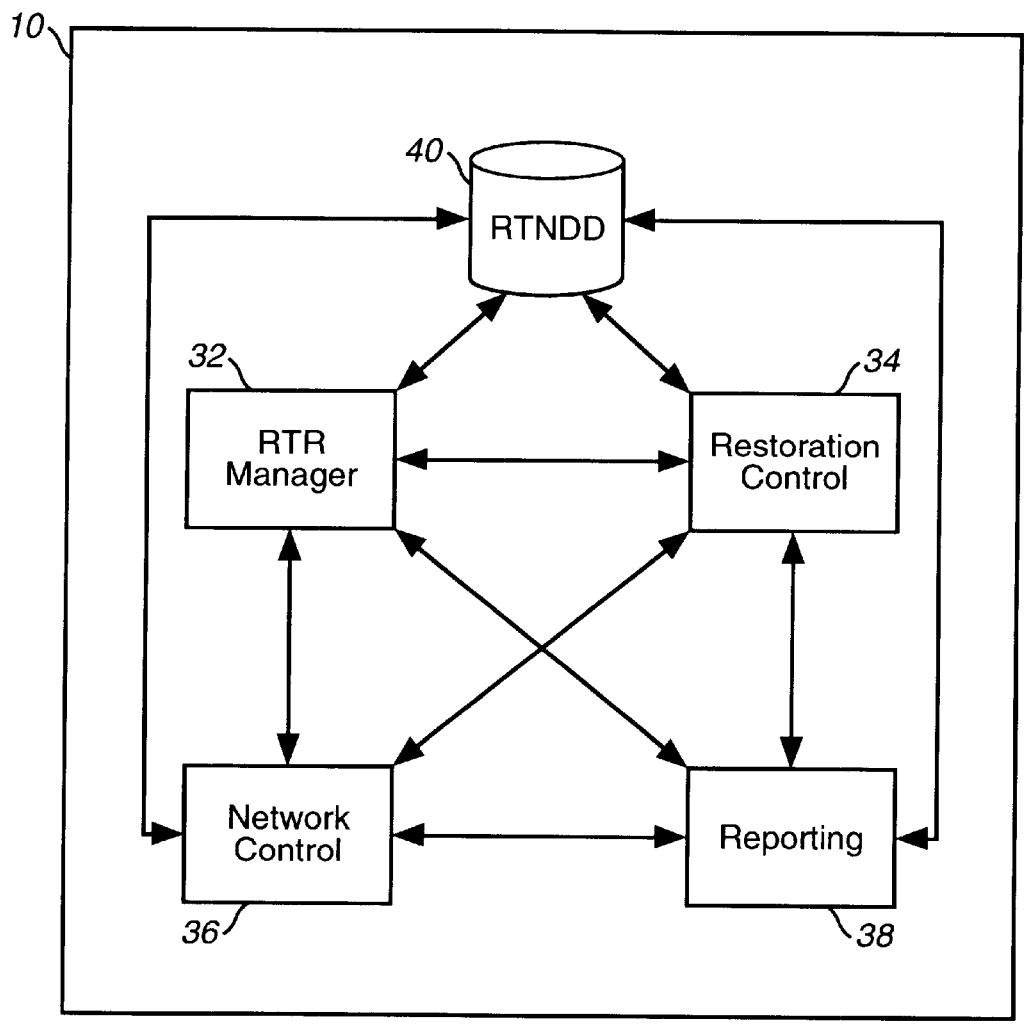
FIG. 3 is a block diagram illustrating an internal architecture of a network restoration system of the present invention.

FIG. 3 is a block diagram illustrating the high-level internal architecture of RTR 10. RTR 10 is comprised of four main process components which are an RTR manager 32, a restoration control 34, a network control 36, and a reporting component 38. Each of these components represent a collection of software processes. In addition, certain data elements are used by these components. Each component, comprising several distinct processes and data elements, are shown in detail and described in reference to FIGS. 3–6.

Process components in RTR 10 can communicate with each other through messages that are passed among internal VMS mailboxes. Each process, several of which make up each high-level component shown in FIG. 3, has its own identifiable mailbox address. Using these mailbox addresses, each process can communicate with any other process by sending a properly addressed message. To aid in the convenience of inter-process communications, each high-level component shown in FIG. 3 has a process coordinator component that is responsible for, among other things, distributing messages to other processes within the same high-level component.

In addition to individual data elements used by each process component, the RTNDD 40, a centralized database comprising restoration network device data is used. The RTNDD 40 includes data that reflects each restoration device, such as each DXC 12. It is organized such that each DXC 12 has its own partition within RTNDD 40, and within each DXC 12 partition are individual data elements for each DXC 12 port.

The RTNDD 40 is updated in real-time by the RTR manager 32 with the most current data reflecting the DXC 12 network. It is used by many different process components within RTR 10, as will be described in reference to FIGS. 5–8.

The RTR manager 32 provides a single interface to external control systems 16. This includes all external control systems 16, the RTT 18, and the user display 20. The only exception are the DXCs 12 via the network 14 and the backup communications network 26 which interface directly with network control 36.

RTR Manager 32 also provides centralized control of the RTR 10 system. It receives commands from the external control systems 16, and distributes the commands to internal processes. It also ensure responses are returned when needed. RTR manager 32 is responsible for receiving data from RTT 18, and updating and maintaining data in the RTNDD 40. The RTR manager 32 is described and shown in detail in FIG. 5.

Restoration control 34 is responsible for performing the algorithms for actual network restoration, including route generation for dynamic restoration. Using topology data from the RTNDD 40, restoration control 34 analyzes alarms received from the DXCs 12 and isolates the location of an outage. Restoration control then generates restoration routes for each impacted trunk 30, and sends commands needed to implement restoration routes to network control 36. Restoration control 34 is described and shown in detail in FIG. 6.

Network control 36 provides the interface to the DXC 12 Network. Network control 36 receives commands for DXCs 12 in a generic format from restoration control 34. Network control 36 may also receive commands from external control systems 16 through the RTR manager 32. Network control 36 then translates commands in this generic format to device-specific formats, and issues these commands to the appropriate DXCs 12. Network control 36 also receives responses and unsolicited alarms from DXCs 12, and distributes these to appropriate processes within RTR 10. Network control 36 manages the communications with the DXCs 12 using binary data links over the network 14, as well as backup communications 26. Network control 36 is described and shown in detail in FIG. 7.

Reporting component 38 is responsible for generating all reports 22, issuing pages to a paging system 24, and providing data to the user display 20. Reporting 38 is described and shown in detail in FIG. 6.

There may be more than one instance of RTR 10, each instance running on a separate computer at a different physical location. This is for survivability of the RTR 10 system. However, only one instance of RTR 10 can have control over the restoration process, including communications with DXCs 12, at any one time. Therefore, each instance of RTR 10 runs in one of two execution states: primary and backup. Only one instance of RTR 10 runs in primary state at any time; and it is this instance that has control over the restoration process and maintains communications with the DXCs 12. All other instances of RTR 10 run in backup state. If the primary RTR 10 fails, a backup RTR 10 automatically takes over.

The RTR 10 that is running in primary execution state runs in one of two readiness modes at any time. The two readiness modes are "ready" and "alert". Ready mode is the nominal mode. In ready mode, RTR 10 performs normal processing, including DXC 12 audits and RTNDD 40 updates. When a network outage is declared by RTR 10, based on receiving alarms from the DXCs 12, that meet certain criteria, RTR 10 changes to alert mode. In alert mode, all unnecessary processing, such as audits, cease and RTR 10 prepares to perform processing required for restoration.

Additionally, the RTR 10 that is running in primary execution state can be run with dynamic route generation (DRG) 25 enabled or disabled. This can be selected by the user. When DRG 25 is enabled, restoration control 34 performs dynamic restoration by generating a restoration route in real-time. When DRG 25 is disabled, restoration control 34 performs a restoration pre-plan, which is input by the user. When an outage is detected by RTR 10 and its location has been isolated, RTR 10 presents to the user a list of impacted trunks. The user, through an external control system 16, either selects dynamic restoration (DRG 25 enabled), or selects to use pre-plans (DRG 25 disabled). As noted before, all user input is received by the RTR manager 32 and distributed to other processes, such as those in the restoration control 34.

Figure 4:
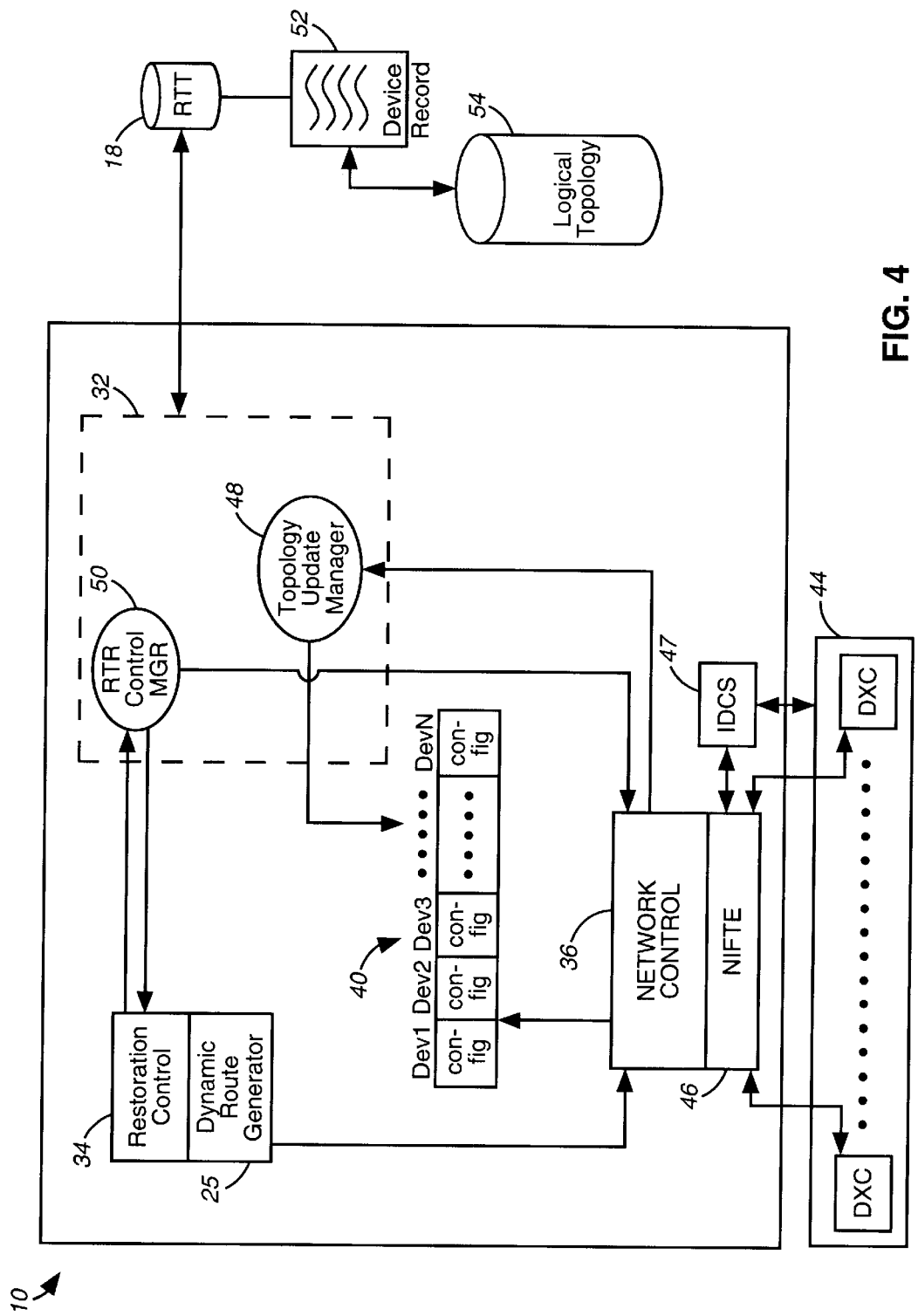
FIG. 4 is a block diagram of software components of a network restoration system of the present invention.

Now referring to FIG. 4 which is a block diagram of the software components that make up the structure of RTR 10, and in one embodiment the components that interface to the RTR 10. The components unique to the RTR 10 application, but not comprising the totality of the RTR 10 application, includes: network control 36, network item front end (NIFTE) 46, RTNDD 40, topology update manager 48, RTR control manager 50, and restoration control 34.

The components that interface with the RTR 10 are the RTT 18, which maintains the logical topology 54 of the physical networks current status, and the network elements that make up the physical topology 44, such as the DXCs 12. The physical topology 44 is the actual network structure. The logical topology 54 is a virtual topology stored in the RTT 18 database comprising binary records containing the current configuration of the physical database based upon user inputs. The physical topology 44 is based upon reporting of the network elements, such as DXCs 12, interfaced through network control 36.

Network control 36 is the process component within the RTR 10 application that communicates with the DXCs 12 through the NIFTEs 46. NIFTEs 46 maintain links between DXCs 12 and network control 36. The links allow network control 36 to distribute commands, such as connect and disconnect commands, to the DXCs 12. NIFTEs 46 receive communications from network control 36 in a nonspecific format and translates such information into a device specific format prior to sending commands to DXCs 12. Information is sent from DXCs 12 to NIFTEs 46 in a device specific format which NIFTEs 46 translates into a non-specific format which is sent to network control 36. An alternate link to each DXCs 12 allows communication to proceed if the first link fails. Network control 36 provides required network device status to the RTNDD 40 database following audits of network 14.

The functionality of network control 36 encompasses link management, interface control, issuing connect and disconnect commands, alarm notification, and audit of a network architecture. Network control includes and manages an administration link, an audit link, a connect and disconnect link, and an alarm link. These are logically defined functions that perform evaluation tests and analysis on network elements, such as DXCs 12, via the links that are established between network control 36 and the network elements. Administration commands set the DXC 12 identification, downloads alarm specifications, and determines the types of DXC 12 within the network architecture. The audit link acquires information about each DXC 12, such as how many ports are on a particular DXC 12, the current configuration of the ports, what ports are cross connected to what ports, the availability of the ports, the status of the ports, and the alarm state of the ports. The audit provides the latest and most current configuration of the DXCs 12 which is needed by the higher level applications. The connect and disconnect channel is reserved primarily for issuing connect and disconnect commands during an outage. The alarm link issues alarm notification if a port goes into alarm. Unsolicited alarms are also sent through an alarm link. RTNDD 40 is the repository of all this information.

RTNDD 40 is an internal database memory resident to RTR 10. The RTNDD 40 is a series of memory partitions, each partition representing a DXC 12. For example, if there were 117 DXCs 12 there would be 117 entries containing information on the status of each DXC 12. The information contained within each device slot is broken down into specifics of the device. RTNDD 40 includes a header of information which identifies each DXC 12. The RTNDD 40 also includes DXC 12 configuration information including the number of port entries for each DXC 12, the type of port, such as data type, and whether the port is provisioned as spare capacity or traffic. RTNDD 40 identifies which port is currently cross connected to another port within the DXC 12.

Network control 36 provides for the verification of spare trunk connectivity. Network control 36 ensures operational readiness of all network links though a system of messages that check for network device functionality. Network control 36 can abstract the specifics of the network hardware by providing a device independent command set which will allow control of any type of DXC 12 device. Network control 36 provides a front end interface, the NIFTEs 46, to the RTR 10 controlled network devices.

The NIFTEs 46 translate the hardware independent commands into the appropriate device specific command. NIFTEs 46 provide asynchronous alarm notification to any requesting RTR 10 component. NIFTEs 46 configure and audit the DXCs 12 such that only one full audit is required at the initial connection to the DXC 12. Subsequently, the DXCs 12 will be configured such that any DXC 12 configuration changes will trigger alarms which the corresponding NIFTE 46 will accept and record the configuration change or initiate the appropriate audit. This approach is called audit by exception and is designed to significantly reduce the processing burden on the RTR 10. NIFTEs 46 will support multiple software and hardware versions of the DXCs 12. NIFTEs 46 may issue several device commands, update the RTNDD 40, receive unsolicited alarms, receive new NIFTE 46 commands, and finally receive a response to the commands issued.

The connection from network control 36 to each DXC 12 includes two redundant diverse paths. There is a third link to the DXCs 12 within the network 14 in case the primary two links of communication fail. The IDCS 47 provides this service to network control 36. This link is much more limited but it is a alternate path which can be used to issue connect and disconnect commands from RTR 10 to DXCs 12.

The update manager 48 updates the RTNDD 40, with regard to the partitions within the device record that include the information or status about each DXC 12. The RTNDD 40 includes the information of all the DXCs 12 within the network topology. The update manager 48 updates the RTNDD 40 in real time to reflect the current status of the network topology.

Restoration control 34 encapsulates the functions that load and analyze network responses, accepts user and network break specifications, presents pre-plan lists in response to break specifications, and accepts a pre-plan specification for execution. In addition, restoration control 34 isolates breaks from real-time alarms received from the DXCs 12, generates routes for the break spec specified, and submits the routes for execution. The primary data elements of restoration control 34 are DXC 12 alarms, breaks, break specifications, routes, plans, and actions.

A DXC 12 alarm may be, for example, a notification from the DXC 12 that the status of a port has changed. A break is a complete collection of break specifications and includes an indication of the end of a break. Each break has a unique ID. A break specification is a message that specifies that a trunk break has been detected and may include a break location if the trunk break was successfully isolated between two DXC 12 ports. A route is the collection of actions required to restore a break specification. A plan is a collection of actions designed to restore a break. An action is an instruction to perform an intra-DXC 12 connect or disconnect between two ports. Breaks are isolated to a port level. Inactivity over a period of time indicates the end of a break. After break isolation has completed, routes are generated based on trunk priority order and dispatched to network control 36 for transfer to the DXC 12.

Figure 5:
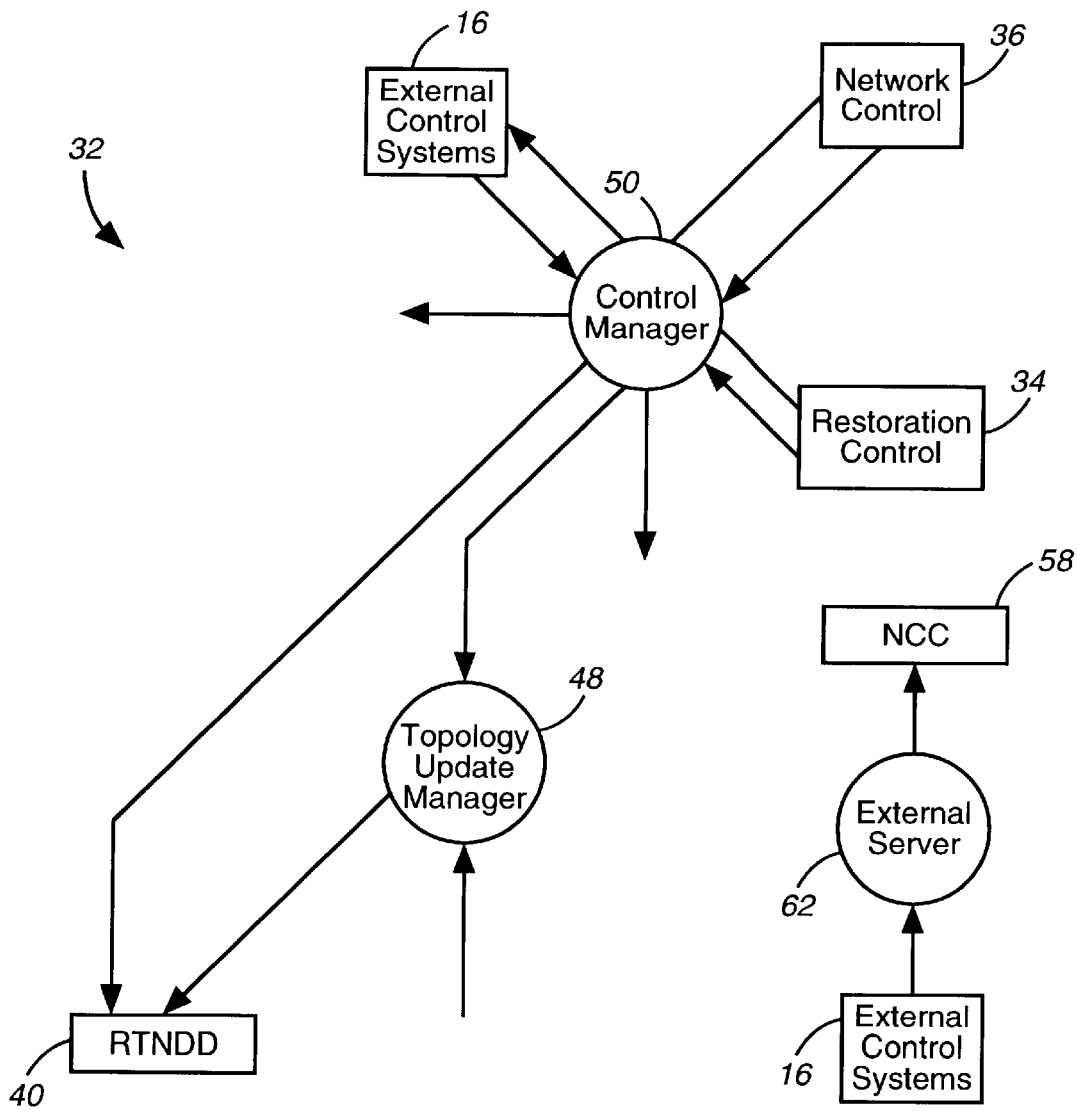
FIG. 5 is a block diagram of a control manager component of a network restoration system of the present invention.

FIG. 5 illustrates in detail the logical architecture of the RTR manager 32. Shown in FIG. 5 are the individual process components and the messages each process sends and receives. As noted before, each process can send messages to and receive messages from other processes.

There are two primary components unique to the RTR manager 32, a control manager 50 and a topology update manager 48. The control manager 50 serves as the interface to external systems. Control manager 50 receives commands from external control systems 16, distributes these commands to the appropriate internal processes, and ensures responses are returned when needed. For example, control manager 50 distributes commands to restoration control 34 and to network control 36. Control manager 50 can also distribute commands that are generated internally by RTR 10. Control manager 50 sends data to external systems as messages identified by internal commands.

Each command sent by control manager 50 to network control 36 has a corresponding response. For example, control manager 50 may send the following commands to network control 36. A command, which is provided by either a user or an external control system, that directs RTR 10 to change its execution state from primary to backup, or from backup to primary. This change in execution state is usually a result of a primary RTR 10 failing, and restoration control making a transition over to a backup RTR 10. Control manager 50 tracks the current execution state of each RTR 10 as an internal data parameter. In addition to updating the internal data parameter with the current execution state, control manager 50 notifies other processes of the change in execution state, which may result in starting up or shutting down of processes. This is done by sending messages to various internal control processes to either initiate processes for startup, or to terminate them for shut down.

Other commands are generated internally in RTR 10 and sent to control manager 50 when a network 14 outage is declared. A network 14 outage is declared when alarms received by DXCs 12 meet certain criteria, such as a specific number of alarms in a time interval. These criteria are used to eliminate spurious alarms that do not indicate an outage. When a network 14 outage is declared, control manager 50 sends out a command to change the readiness mode of RTR 10 from "ready" to "alert". In alert mode, all unnecessary processing, such as device audits and topology data updates, cease. When the outage is cleared, control manager 50 sends out a command to change the readiness mode of RTR 10 back to "ready". Control manager tracks the current readiness mode as an internal data parameter.

There are commands that instruct network control 36 to start and stop NIFTE 46 processes. A NIFTE 46 process is a component of network control 36 that serves as a communications interface with a DXC 12. There is a distinct instance of a NIFTE 46 process for each DXC 12. The start/stop NIFTE 46 commands can be generated internally upon startup of the RTR 10 system, or can be provided by an external system to request connection to a new DXC 12.

Commands are used and provided by an external control system 16 that instructs network control 36 to initiate, for example, a remote spares verification (RSV) process 56. The RSV process 56 is part of network control 36, and is described in reference to FIG. 5. External control systems 16 may also instruct network control 36 to initiate an audit of one or more DXC devices 12. This audit is performed by the NIFTE 46 component of network control 36, but the command message is sent to a network control coordinator (NCC) 58 component for distribution. This command is a request for a data read of the RTNDD 40, to be performed by the NIFTE 46.

Figure 7:
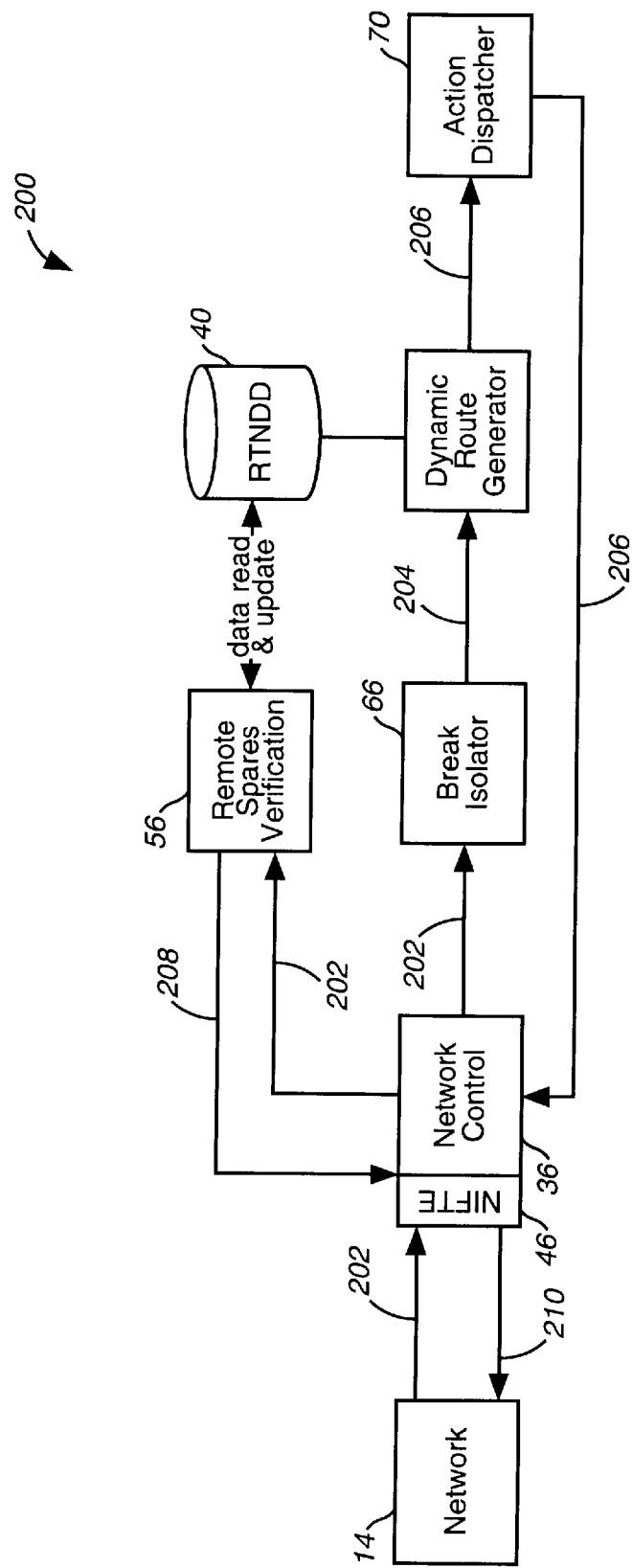
FIG. 7 is a block diagram depicting a remote spares verification component of the present invention within a dynamic network restoration system.

The NCC 58 serves as the main interface and message distributor for the network control 36 component, and is described in reference to FIG. 7.

Commands received by control manager 50 and distributed to the restoration control 34 interface include the following: The change execution state command as described previously, the change DRG mode command, which instructs restoration control 34 to enable or disable DRG 25. When DRG 25 is enabled, restoration control 34 performs dynamic restoration. When DRG 25 is disabled, restoration control 34 performs pre-plan restoration. Control manager 50 tracks the current DRG 25 mode as an internal data parameter.

After an outage is cleared, a normalization plan is sent to the restoration control 34 to return the DXCs 12 to their original state prior to the outage. This normalization plan is sent from the user display (20) system (PC) or (WS) directly to the restoration control 34. In addition to responses to change execution state and change DRG mode commands, the control manager 50 receives from restoration control 34 a restoration status message. This message provides data on the current status of a restoration process.

The topology update manager (TUM) 48 is responsible for updating data in the RTNDD 40. TUM 48 receives external data on network 14 topology from RTT 18. TUM 60 makes appropriate updates to RTNDD 40. The TUM 60 also receives messages from the NIFTEs 46 indicating that the results of a DXC 12 audit are not consistent with what is reflected in the RTNDD 40 for that DXC 12. While the NIFTE 46 is responsible for making some updates to RTNDD 40, the TUM 60 is responsible for making other updates. If the NIFTE 46 notes an inconsistency of data in the RTNDD 40 for which it is not responsible for updating, it will send a request to the TUM 60 to reconcile the data in the RTNDD 40.

An external server 62 may serve as a front-end focal point to control manager 50 for receiving input from and providing output to external systems. The external server 62 may be incorporated into the control manager 50. Additional messages sent directly by this component, as shown in FIG. 5, may include a command that registers an external system as a client for alarms received. External systems, as well as internal RTR 10 processes, can register to receive certain types of alarms. When network control 36 receives alarms from DXCs 12, it determines a list of alarm recipients, and distributes the alarms accordingly.

The external server 62 may send commands to the NCC 58 that request the NIFTEs 46 to issue a port connect or port disconnect command to a DXC 12. While the restoration control 34 component generates these commands to implement a restoral route, RTR 10 may also receive these commands from external control systems 16.

Figure 6:
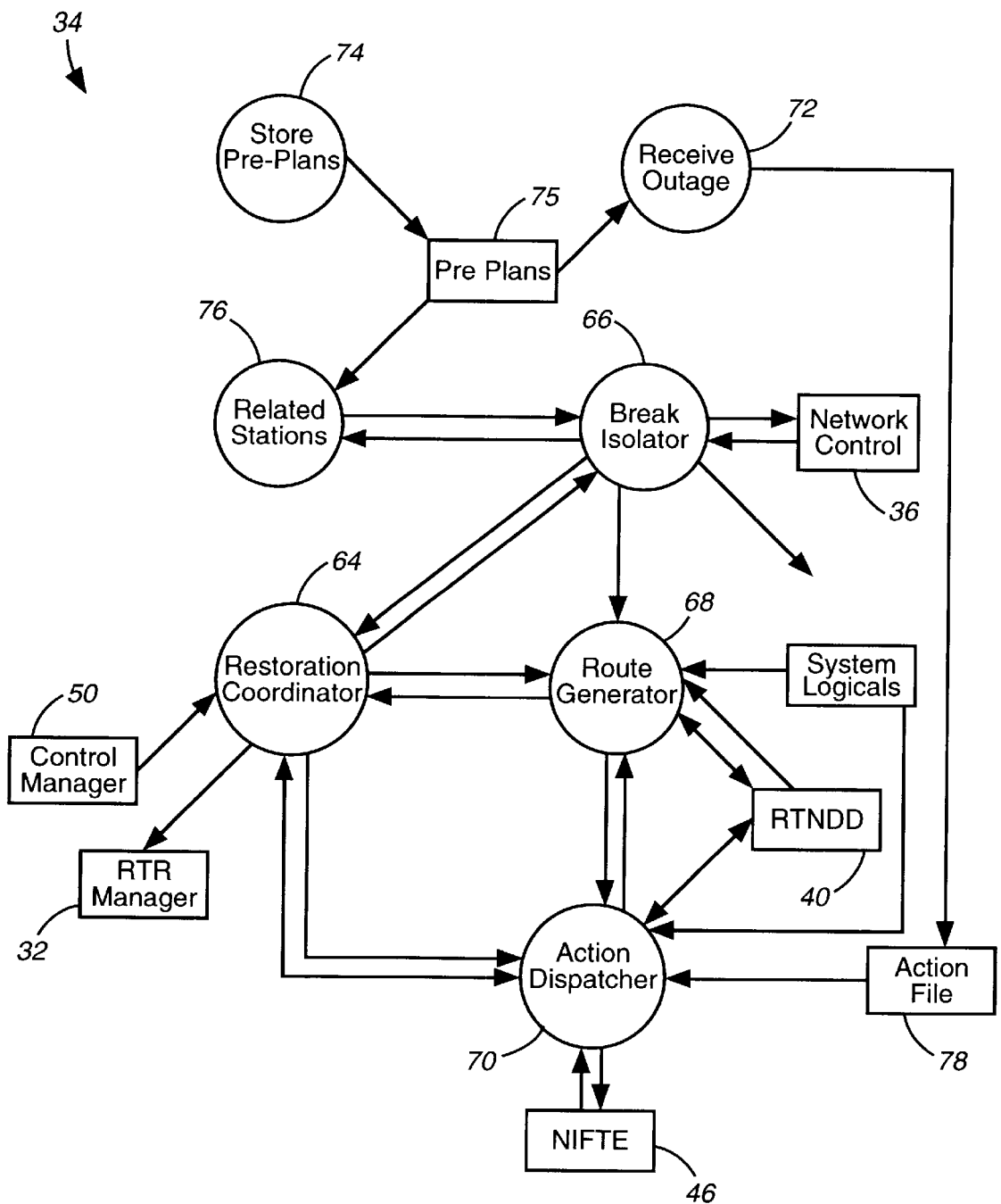
FIG. 6 is a block diagram of a restoration control component of a network restoration system of the present invention.

FIG. 6 illustrates in detail the logical architecture of restoration control 34. Restoration control 34 is comprised of four key components, restoration coordinator 64, break isolator 66, route generator 68, and action dispatcher 70.

The restoration coordinator 64 serves as the main interface for all processes within restoration control 34. When RTR 10 starts up and is placed in primary execution state, the restoration coordinator 64 establishes communication with each of the other restoration control 34 process components. The restoration coordinator 64 receives commands from external control systems 16 via the control manager 50, and distributes them to the appropriate processes within restoration control 34. Distribution of commands to other processes often requires a specific timing and sequence, which the restoration coordinator 64 controls. The restoration coordinator 64 also communicates restoration status to the RTR manager 32.

The break isolator 66 is responsible for receiving DXC 12 alarms from network control 36, identifying the trunks 30 impacted (both traffic trunks and spares), and isolating the location of the outage, or break.

When a network 14 outage occurs, DXCs 12 sends unsolicited alarms to RTR 10. These alarms are received by NIFTEs 46 and passed on to the break isolator 66 in messages. The break isolator 66 collects alarms and maintains a list of active alarms.

The break isolator 66 registers for receipt of all alarms and it sends a message to network control 36. This message instructs network control 36, and specifically the NIFTEs 46 to send the break isolator 66 alarms generated by DXCs 12. NIFTEs 46 return a response message to confirm. The break isolator 66 then begins receiving alarms from the network 14. Alarms will be received even when no outage has occurred. These alarms are spurious, and may be generated for a variety of reasons, such as detection of a weakened signal.

The break isolator 66 applies certain criteria to active alarms to determine if an outage has occurred. Such criteria includes the number of alarms received in a time interval. The break isolator 66 also waits a predetermined time before declaring an outage. The break isolator 66 uses topology data from the RTNDD 40 to correlate alarms to determine if multiple alarms are related and uses tunable thresholds to determine if alarms are a probable result of an outage. The break isolator 66 then determines the location of the outage to a trunk segment 30 between two restoration devices, typically DXCs 12. The break isolator 66 then sends this specification of the outage to the route generator 68. If DRG 25 is disabled, and restoration pre-plans are to be used, the break isolator 66 tracks the list of impacted trunks to ensure each one is successfully restored by a pre-plan.

The route generator 68 receives break specifications from the break isolator 66 and generates restoral routes, if DRG 25 is enabled.

The route generator 68 first sends a restoration status message to the restoration coordinator 64, indicating that restoration is in process. This triggers the restoration coordinator 64 to notify the control manager 50 to place RTR 10 in a readiness mode of "alert."

Route generator 68 reads data from RTNDD 40, and uses this data to determine an optimal restoral route for each impacted trunk based upon traffic trunk priorities. This determination should take into account the costs of different restoral routes. Such cost data is derived. For example, based upon capacity type number of segments, distance, and the number of connections.

RTNDD 40 is also queried for a list of available spare trunks that can be used for restoral routes. If a break specification is received for a spare trunk, the route generator 68 updates RTNDD 40 to indicate this spare is broken and is not available for restoral routes.

When a restoral route is determined, route generator 68 identifies each port on each DXC 12 that is needed for the restoral route and formulates commands needed to implement the route which generally comprise port connects and disconnects in DXCs 12. These commands are in a generic format, in that they refer to DXC 12 devices and ports in a generic manner. These generic commands will be translated to actual commands needed for specific DXC 12 by the NIFTEs 46. Route generator 68 creates a file of these commands, and then provides this file to the action dispatcher 70.

The action dispatcher 70 receives commands from the route generator 68 for implementing the restoral route. The action dispatcher 70 distributes these commands directly to the NIFTEs 46, bypassing the NCC 58 for performance reasons. Since there is an individual NIFTE 46 process running for each DXC 12, the action dispatcher 70 must distribute individual commands to certain NIFTE 46 processes.

If DRG 25 is disabled, the route generator 68 does not perform any route generation. The action dispatcher 70 receives an action file 78 from receive outage 72. The action file 78 comprises actions needed to implement a restoral route. These actions are in the same format as those received from route generator 68, except they have been specified by a restoration pre-plan. The action dispatcher 70 distributes these commands to individual NIFTEs 46.

Restoration control 34 also includes other components used in the pre-plan restoration process. Load preplans 74, and receive outage 72 are used to download appropriate restoration pre-plans 75 from an external control system 16, and submit them to action dispatcher 70 for implementation. Thus, the present invention combines the ability to execute pre-plans with a dynamic network restoration system on the same platform. Restoration control 34 is responsible for initiating the main processing loops of the other components. This is performed at startup of RTR 10 by receiving a message from the control manager 50.

In an alternate embodiment to the processes previously described, the break isolator 66, when it has compiled a list of impacted trunks, may present this list to the user via the user display 20. RTR 10 then allows the user to either select a pre-plan 75 for each trunk or to select dynamic restoration.

If the user selects DRG 25, then the break isolator 66 sends the break specification to the route generator 68. The route generator 68 proceeds with dynamic restoration, as previously described. If the user selects a pre-plan 75, then the break isolator 66 does not need to determine the location of the impacted trunk segments 30. There will be a pre-plan 75 provided for the outage. These pre-plans 75 are downloaded and provided by the load pre-plans 74 and receive outage 72 components. They are provided directly to the action dispatcher 70 in an action file 78. However, the break isolator 66 maintains the list of impacted trunks to ensure each one gets restored. If a pre-plan 75 does not get implemented successfully, the break isolator 66 will present the impacted, unrestored trunks to the user again, and allow the user to select either another pre-plan 75, or dynamic restoration.

FIG. 7 is a block diagram illustrating an example of the present invention's use in a dynamic network restoration system and is noted generally as 200. The present invention is a software component that performs remote spares verification (RSV) 56. RSV 56 is responsible for verifying that the network 14 topology stored in RTNDD 40, which will be used by DRG 25 to generate restoration routes, accurately reflects the actual topology of a network 14.

A network 14 includes DXCs 12 that can be used to re-route traffic in the event of an outage. The ports of a DXC 12 are built such that if a loss of signal is detected, a degradation of signal, or a change in signal type, they will generate an alarm 202.

Port alarms 202 are sent to network control 36, which serves as the interface to RTR 10. The NIFTE 46 within network control 36 that performs communications management, data translations, and protocol conversions. Network control 36 passes alarms on to both RSV 22 and a break isolator 66.

The break isolator 66 receives port alarms 202 that were generated on the network 14. The break isolator 66 performs various analysis processes to filter out alarms 202 that are not a result of a network 14 outage, identify all trunks 30 impacted by an outage, and to isolate the location of the outage between the nearest two DXCs 12. The break isolator 66 also identifies plural outages when such conditions occur.

The break isolator 66 then produces break specifications 204. These specifications 204 are messages that specify each trunk 30 that requires restoration, the logical topology of each trunk 30, and the two DXCs 12 on each trunk 30 between which restoration is needed.

The break specifications 204 produced by the break isolator 66 are then sent to the DRG 25. The DRG 25 generates restoration routes for each trunk 30 impacted by the outage. DRG 25 uses topology data from the RTNDD 40 to determine where spare capacity is available for restoration routes.

The RTNDD 40 includes data that identifies each restoration DXC 12 in the network 14. This data includes identification of each DXC 12, identification of each DXCs 12 ports, internal cross-connectivity of ports, external interconnectivity or ports, and other configuration data. This data is maintained for all network 14 capacity, including spare segments. The RTNDD 40 also specifies current states of DXCs 12 and ports, which includes alarms 202 states.

In determining restoration routes for each trunk 30 identified in a break specification 204, the DRG 25 also determines the actions 206 needed by various DXCs 12 to implement each restoration route. These actions 206 are then provided to the action dispatcher 70.

The action dispatcher 70 dispatches the actions to a particular NIFTE 46 instance within network control 36. In one embodiment of the network control 36, there will be a distinct NIFTE 46 process running for each DXC 12 in the network 14. Network control 36 formulates device-specific commands that specify these actions, and then issues these action commands to the network 14.

The RSV 56 must ensure that the spare capacity topology data provided by the RTNDD 40 to the DRG 25 accurately reflects the current topology of spare capacity in the network 14. To do this, the RSV 56 sends actions 208 to various DXCs 12 via the corresponding NIFTEs 46. These actions 208 are intended to generate alarms 202 on specific ports of the DXCs 12. Actions 208 may include port connects and disconnects that can be used to generate and propagate alarms 202 along a spare segment, as will be described below.

Actions 208 may also include other commands that generate alarms 202 on certain ports or alarm clears which are messages instructing DXCs 12 to clear an active alarm 202. The strategy used by the RSV 56 for issuing alarms 202 and alarm clear actions 206 to DXCs 12 will be described in reference to the process shown in FIGS. 9–11.

The RSV 56 receives alarms 202 and alarm clears from DXCs 12 in the network 14 via network control 36. The RSV 56 analyzes alarms 202 received to determine in real-time the actual topology of spare trunk segments 30. The RSV 56 compares actual topology data with the expected topology that is reflected in the RTNDD 40. RSV 56 will identify all spare segments for which the expected topology reflected in the RTNDD 40 does not match the actual topology as determined by RSV 56. RSV 56 designates these spare segments as unavailable. Thus, when DRG 25 reads the RTNDD 40 for data on spare segments that can be used in generating restoration routes, the DRG 25 will not use those spare segments that the RSV 56 designated as unavailable. This prevents the DRG 25 from generating restoration routes using spare capacity that may cause a restoral route to fail.

Alternatively, the RSV 56 can create a list of spare segments that have been determined to be unavailable, and sends this list directly to the DRG 25. Similarly, the RSV 56 can create a list of spare segments that RSV 56 has determined to be available, and send this list to the DRG 25.

Figure 8:
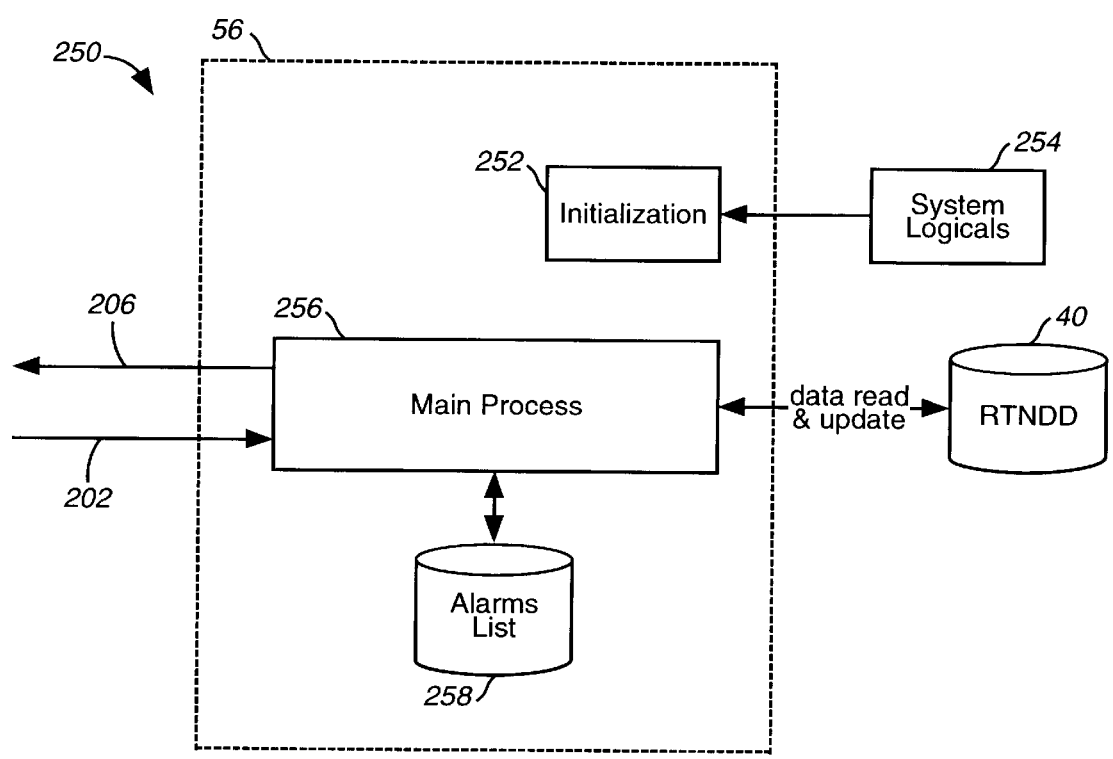
FIG. 8 is a block diagram of the component parts of a remote spares verification component of the present invention.

FIG. 8 illustrates the internal architecture of RSV 56 and is denoted generally as 250. RSV 56 has an initialization component 252 that performs several functions at startup. RSV 56 reads a store of system logicals 254 to determine run-time parameters. These may include the mode of operation, execution state, or any others that are needed, depending on the embodiment. For example, use of execution state and operational mode parameters may be used to determine whether of not the RSV 56 should be executed.

Initialization 252 also registers for receipt of all port alarms 202 from the network 14. While this registration process depends on the embodiment of RTR 10, generally, initialization 252 will register with the network control 36. This registration ensures that all alarms 202 collected from the network 14 will be sent to RSV 56. RSV 56 will then receive all alarms 202 from the network 14, however, RSV 56 is only interested in those that were intentionally generated by the RSV 56. RSV 56 must therefore distinguish between these alarms 202 and all other alarms 202 as will be described in reference to FIGS. 9–11.

RSV 56 primarily comprises a main process 256. Main process 256 creates the actions 208 needed to cause DXCs 12 in the network 14 to generate an propagate alarms 202 along spare trunk segments. Main process 256 then receives these alarms 202 and stores them in an internal alarms list 258. RSV 56 uses the alarms list 258 to track its analysis of alarms 202 and determine the actual topology of a spare trunk segment 30.

RSV 56 retrieves the expected topology of a spare segment from the RTNDD 40 and compares the expected topology with the actual topology. If this comparison produces an exact match, or a partial match that meets specific criteria as will be described in reference to FIGS. 9–11, the spare trunk segment 30 designation is kept available. If the comparison fails to produce such a match, RSV 56 designates the spare trunk segment 30 as unavailable.

A single execution of the main process 256 of RSV 56 verifies the topology of a single spare trunk segment 30. RSV 56 can perform multiple instances of its main process 256 in parallel, to verify multiple spare trunk segments 30 in parallel. RSV 56 may alternatively perform the main process 256 as a continuous loop, in which it runs through the entire or partial network 14 topology data in RTNDD 40 over and over, constantly verifying spare capacity in the network 14. Similarly, RSV 56 can perform its main process 256 at periodic intervals, or for selected spare trunk segments 30.

Figure 9:
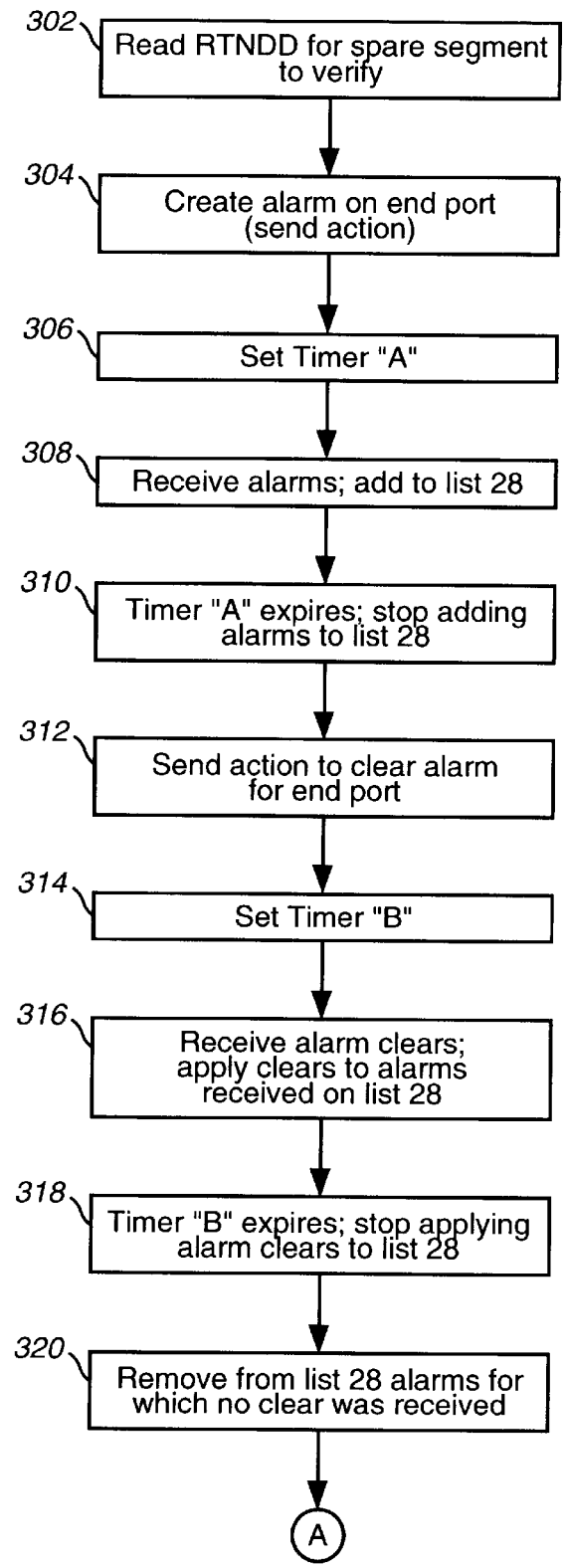
FIGS. 9–11 are flow diagrams detailing the steps of a remote spares verification process of the present invention.
Figure 10:
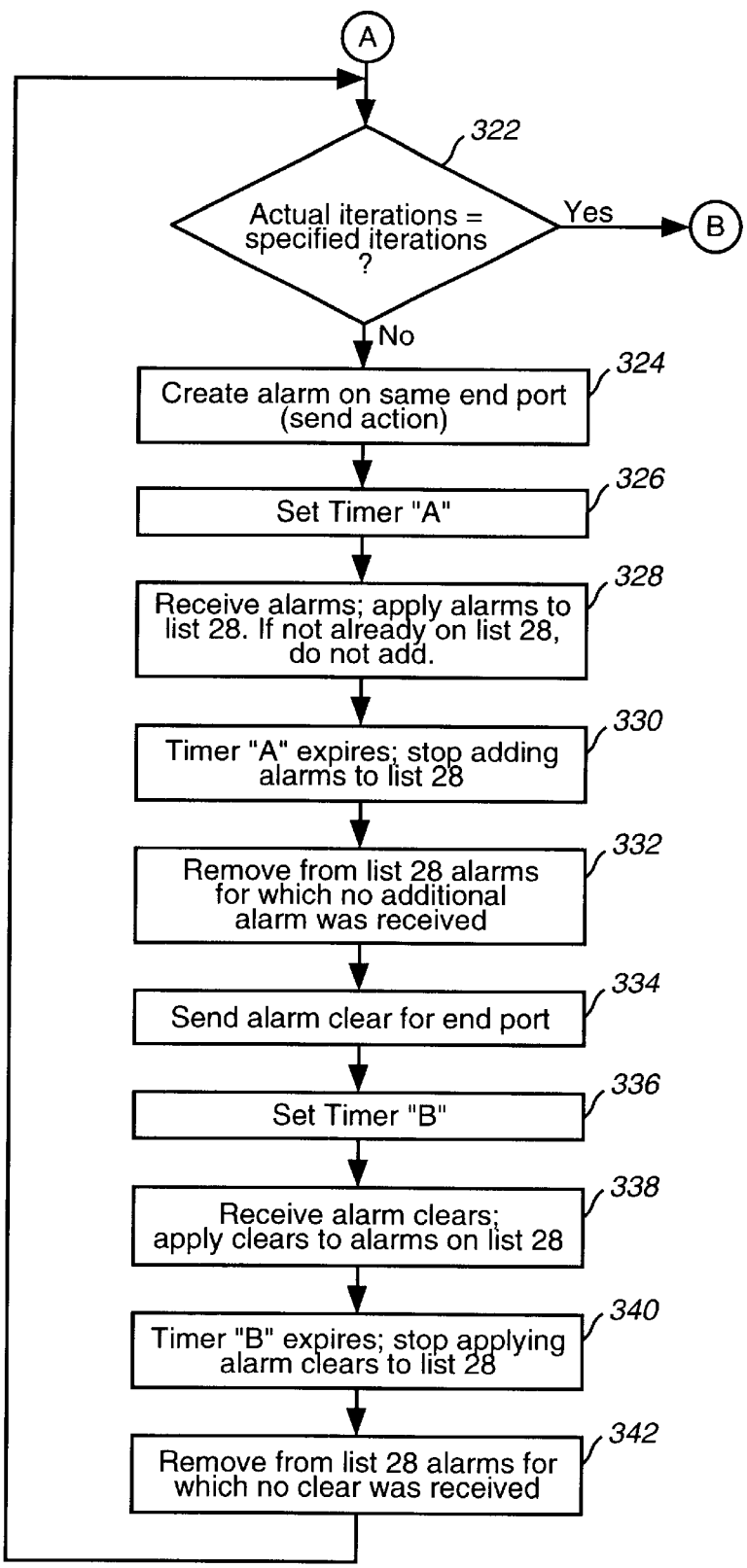
Figure 11:
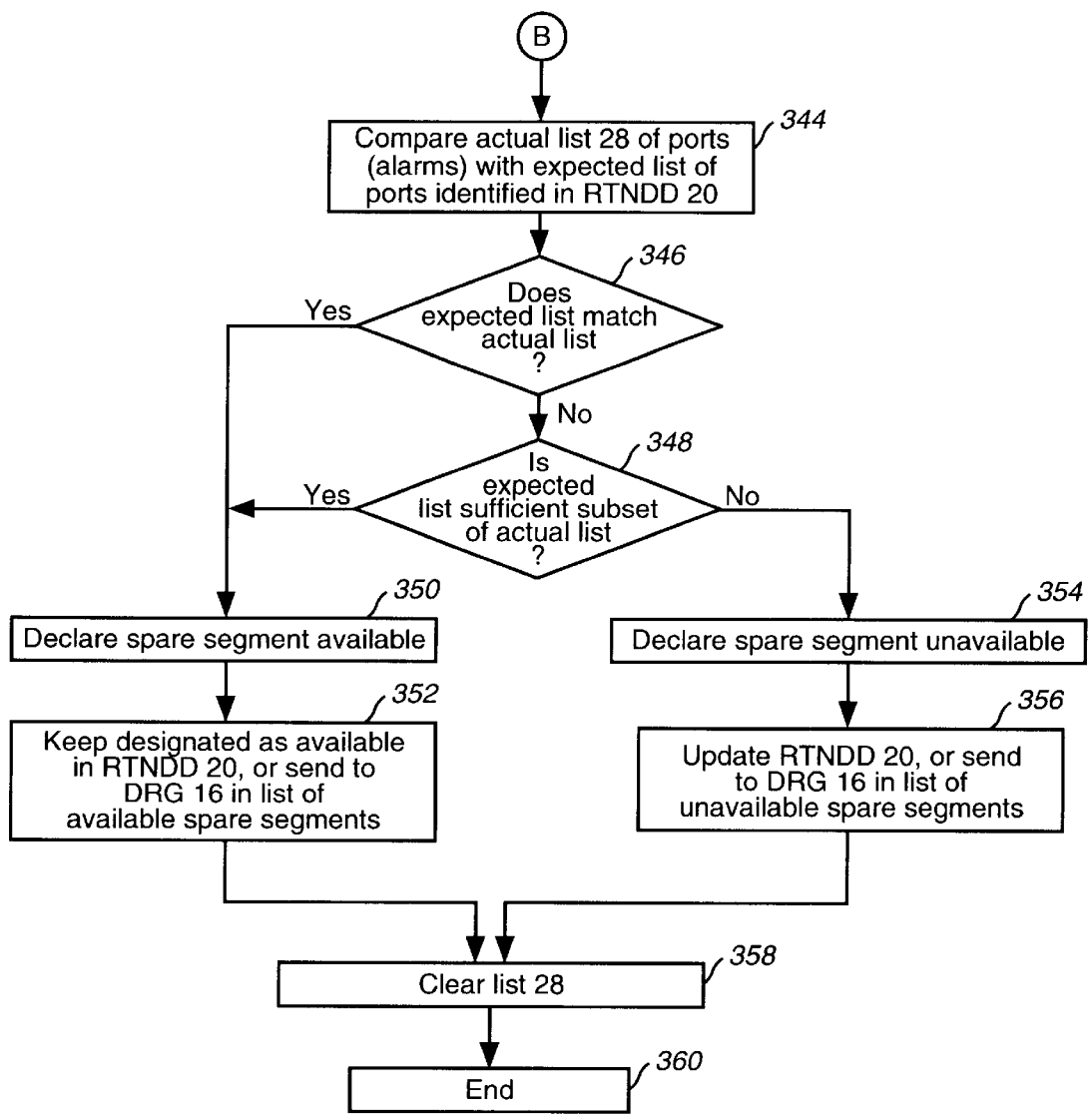

FIGS. 9–11 are flowcharts illustrating the main process 256 of the RSV 56. This process 256 assumes that initialization 252 has occurred, in which RSV 56 registers for receipt of alarms 202.

In step 302, RSV 56 reads the RTNDD 40 to locate a spare trunk segment 30 to verify the topology. RSV 56 will also retrieve topology data from RTNDD 40 for that spare trunk segment 30. This will be referred to as the expected topology for the spare trunk segment 30. RSV 56 stores the expected topology for a later comparison against the actual topology that RSV 56 will determine.

In step 304, RSV 56 creates an alarm 202 on one end port of the spare trunk segment 30. To do this, RSV 56 sends an action 208 to a specific DXC 12. This action 208 causes a port on DXC 12 to generate an alarm 202.

Figure 12:
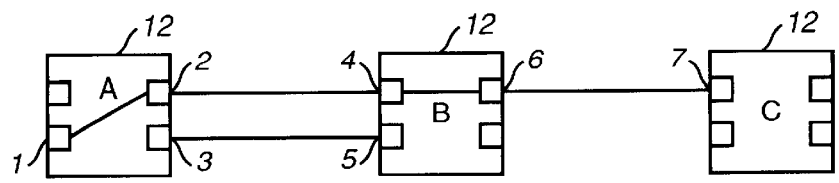
FIG. 12 is a schematic illustration of switching elements in a communications network.

Referring also to FIG. 12, three DXCs 12 are shown, A, B and C. A is shown with a port 1 cross-connected to port 2. B is shown with port 4 cross-connected to port 6. C is also shown with no ports cross-connected. A segment of a spare trunk 30 traverses A2, B4, B6, and C7.

DXCs 12 are designed so that ports that detect an outage on a segment will generate alarms 202. All ports that "face" an outage will generate an alarm 202. For example, if an outage occurs on the segment between B6 and C7, not only will C7 and B6 generate alarms 202 but an alarm 202 will be generated on A2, since each of these ports face the outage.

To generate and propagate alarms 202, RSV 56 can, for example, send a command 208 to C to cause it to generate an alarm 202 on port 7. This alarm 202 will be transmitted along the segment to B6, which will see the alarm 202, assume the alarm 202 is a result of an outage, and generate an alarm 202. B4 will not see the alarm 202, since the alarm 202 does not face the source, and will therefore not generate an alarm 202. A2, however, does face the source, will see the alarm 202, and will generate an alarm 202. All alarms 202 generated will be sent to network control 36 and received by RSV 56. Using this technique of propagating alarms 202 along a spare trunk segment 30, RSV 56 determines the topology of a spare trunk segment 30.

The method used by RSV 56 to cause DXCs 12 to generate an alarm 202 on the end port of a spare trunk segment 30 varies, depending on the specific type of DXC 12. For example, in one embodiment of DXCs 12, one port on DXC 12 is designated an alarm port. This port constantly generates an alarm 202. If it is not cross-connected to any other port, however, the alarm 202 will not propagate. RSV 56 causes the propagation of the alarm 202 by cross-connecting the alarm port to another port.

In FIG. 12, suppose A1 is the designated alarm port. RSV 56 can send an action 206 command to cross-connect A1 to A2. When this happens, the alarm 202 that is constantly generated by A1 will be transmitted via A2 to B4. As such, A2, B4 and C7 will see the alarm 202 and generate their own alarms 202. RSV 56 can then send an action command 208 to cross-connect A1 to A3. When this happens, the alarm 202 will be transmitted via A3 to B5. In this instance, A3 and B5 will see the alarm 202 and generate an alarm 202.

In an alternate embodiment of DXC 12, any port can generate an alarm 202 based on the receipt of a specific command 208. First, RSV 56 identifies the end port of a spare trunk segment 30 (e.g., C7). Second, RSV 56 confirms this port is not cross-connected to any other port on the DXC 12 by querying the RTNDD 40, which maintains current cross-connect data. Finally, RSV 56 sends an action command 208 to the DXC 12 to generate an alarm 202 on the specified port. This alarm 202 will be transmitted along the trunk segment 30 and received by ports that face the alarming port. For example, when C7 generates an alarm 202, the alarm 202 is transmitted to B6. B6 and A2 will each see the alarm 202 and generate their own alarms 202.

Referring again to FIGS. 9–11, although RSV 56 has created alarms 202 in step 304 that it expects to receive back from the network 14, RSV 56 will actually receive many more alarms 202. The network 14 is constantly generating alarms 202 from all types of sources, and RSV 56 will receive all of these alarms 202, since RSV 56 has registered for such during initialization 252. To determine current topology of a spare trunk segment 30, however, RSV 56 is only interested in alarms 202 that are a direct result of the alarm RSV 56 has created in step 304.

Therefore, in step 306, RSV 56 sets a timer, timer "A". Timer "A" represents an interval of time (i.e., 15 seconds) that is set by a user. DXCs 12 generally have a delay between receiving an alarm 202 on a port and sending an alarm 202 to NIFTE 46 of network control 36. This delay, which is usually no more than 15 seconds, is what timer "A" is intended to cover. During this time, RSV 56 will receive all alarms 202 from the network 14 and will store these alarms 202 in an internal alarms list 258 as specified in step 308. When timer "A" expires in step 310, RSV 56 will continue to receive alarms 202, but will ignore them and will not store them in the alarms list 258.

This way, RSV 56 stores all alarms 202 that are received as a direct result of the alarm 202 created in step 304. RSV 56 will also store many additional alarms 202 that are not direct result of this initial alarm 202. RSV 56 cannot immediately distinguish between these two types of alarms 202. Further processing, however, will provide this distinction.

In step 312, RSV 56 sends an action to clear the alarms 202 that were generated in step 304. As a result, the end port will stop alarming, and all downstream ports that were alarming as a result of the end port's alarm 202 will also clear their alarms 202. This will occur over the next few seconds.

In step 314, RSV 56 sets another timer, timer "B", to cover this period. Timer "B" may be set to any time interval (i.e., 15 seconds) as selected by a user. In step 316, during execution of timer "B", RSV 56 receives alarm clears from the network 14 as a result of step 312. RSV 56 applies these clears to the alarms received in step 308 and added to the alarms list 258.

Each alarm 202 in the alarms list 258 corresponds to a port that sent an alarm 202 during execution of timer "A". When an alarm clear is received, if the corresponding port is found in the alarms list 258, that port is marked as having been cleared of its alarm 202. If the corresponding port is not found in the alarms list 258, the alarm clear for the port is ignored.

In step 318, timer "B" expires and RSV 56 stops applying alarm 202 clears to the alarms list 258. In step 320, any alarm 202 on the alarms list 258 for which a clear was not received in step 316, is removed.

At this time, the alarms list 258 includes all ports that alarmed as a result of the original alarm 202 created by RSV 56 in step 304 and cleared their alarms 202 as a result of the alarm clear created by RSV 56 in step 312.

Thus, the ports in the alarms list 258 at this time are probably connected via a common spare trunk segment 30. This process represented by steps 304–320 is not absolute, however, in that some alarms 202 may be received during timer "A" and cleared during timer "B" that are not a result of the actions of RSV 56, and are not connected to the common spare trunk segment 30.

Therefore, the RSV 56 may perform this process, represented by steps 304–320, for several iterations. Each iteration hopes to filter out "unrelated" alarms 202, until such a time that only "related" alarms 202 remain in the alarms list 258, representing ports connected by the spare trunk segment 30. The number of iterations is set by the user, and will usually be in the range of 3–5.

In step 322, if the number of iterations performed does not equal the number specified by the user, then the process of steps 304–320 is repeated, with slight adjustments. These adjustments warrant the illustration of the repeated, albeit revised, steps represented by steps 324–342.

In step 324, RSV 56 creates another alarm 202 on the same port as it did in step 304. In step 326, RSV 56 sets timer "A". In step 328, RSV 56 receives alarms 202 from the network 14 that are both related alarms 202 (a result of the alarm 202 created in step 324) and unrelated alarms 202. Instead of adding all alarms 202 to the alarms list 258, RSV 56 checks to see if the port corresponding to the newly received alarm 202 is already on the alarms list 258. If it is, then RSV 56 designates the port as having sent another alarm 202. If the port is not found on the alarms list 258, the newly received alarm 202 is dropped. In step 330, timer "A" expires. RSV 56 stops applying newly received alarms 202 to the alarms list 258.

In step 332, RSV 56 removes from the alarms list 258 any port for which a second alarm 202 was not received. Therefore, only ports that generated an alarm 202 for both the first and second creation of an alarm 202 by RSV 56 will remain on the alarms list 258. In step 334, RSV 56 sends an action to clear the alarm 202 that was generated in step 324. As a result, the end port will stop alarming, and all downstream ports that were alarming as a result of the end port's alarm 202 will also clear their alarms 202. This will occur over the next few seconds.

In step 336, RSV 56 sets timer "B" to cover this time period. In step 338, RSV 56 receives alarm clears that are both related to the alarm clear it created in step 334, and that are unrelated. RSV 56 applies these clears to the alarms list 258. If the port is found on the alarms list 258, the port is designated as having been cleared. If the port is not found, the clear is dropped.

In step 340, timer "B" expires and RSV 56 stops applying alarm clears to the alarms list 258. In step 342, RSV 56 removes from the alarms list 258 any ports for which an alarm 202 clear was not received in step 338.

Now, the only ports remaining on the alarms list 258 are those for which an alarm 202 was generated during the first interval of timer "A", an alarm 202 was cleared during the first interval of timer "B", another alarm 202 was generated during the second interval of timer "A", and an alarm 202 was cleared during the second interval of timer "B". This process may be repeated a specified number of iterations in order to reduce the alarms list 258 to contain only those ports that are part of the spare trunk segment 30 being verified. Preferably, this number of iterations will be in the range of 3–5.

When this number of iterations has been reached, as determined in step 322, then the RSV 56 can assume to have in its alarms list 258 a list of ports that make up the actual topology of the spare trunk segment 30.

In step 344, RSV 56 compares the actual topology (the list of ports in the alarms list 258) with the expected topology (the list of ports obtained from the RTNDD 40). The expected topology will be the list of ports for which alarms 202 should have been generated. These will not be all ports that make up the spare trunk segment 30, but rather those ports that face the port on which RSV 56 was generating alarms 202.

If, in step 346, the expected topology matches the actual topology exactly, then in step 350, RSV 56 declares the spare trunk segment 30 available. If the expected topology does not exactly match the actual topology, then another comparison is made in step 348.

In step 348, if the expected topology is a subset, of sufficient degree, of the actual topology, then a match can be declared. Sufficient degree is as stated by the user (i.e., a 90% subset). For example, if the expected topology is:

DXC D port 501
DXC E port 503
DXC E port 505
DXC F port 507
DXC F port 509
DXC G port 511 and the actual topology determined by the RSV 56 is:

DXC D port 501
DXC E port 503
DXC E port 505
DXC F port 507
DXC F port 509
DXC G port 511
DXC G port 513
DXC H port 515 then a match may be assumed. The discrepancy (additional ports in the actual topology) may be a result of unrelated alarms 202 remaining in the alarms list 258, or extended connectivity of the spare trunk segment 30 that is not reflected in RTNDD 40. In the latter case, the spare trunk segment 30 may still be used because the connectivity (topology) of the spare trunk segment 30 as reflected in RTNDD 40 is accurate and there is simply an extension in the actual network 14 that will not affect the implementation of a restoration route.

If a match or sufficient subset of a match is made, then in step 350, RSV 56 declares the spare segment available. In step 352, RSV 56 keeps the available designation of the spare segment intact in the RTNDD 40. Alternatively, RSV 56 can compile a list of available spare segments and send this list directly to the DRG 25. The DRG 25 will use this list to select spare segments for restoration routes.

If a match or sufficient subset in not made, then in step 354, RSV 56 declares the spare trunk segment 30 as unavailable.

In step 356, as output of its determination, RSV 56 updates RTNDD 40 to designate the spare trunk segment 30 as unavailable. Alternatively, RSV 56 can compile a list of unavailable spare segments and send this list to the DRG 25. The DRG 25 will use this list to eliminate spare segments obtained from the RTNDD 40 that it cannot use for restoration routes.

In step 358, RSV 56 clears the alarms list 258, in preparation for another execution of the main process 256, in which another spare trunk segment 30 will be verified. The process ends with step 360.

The process performed by RSV 56 has a direct impact on DXCs 12 in the network 14. Certain port connects and disconnects are issued by RSV 56, as well as alarms 202. This occurs on spare capacity, and therefore does not impact live traffic.

When an outage occurs, spare capacity needs to be made available for use in restoration routes. In one embodiment of RSV 56 in RTR 10, an operational mode parameter of RTR 10 is changed from "ready" to "alert". This operational mode parameter is stored in system logicals 254. When it is changed to "alert", RSV 56 ceases all verification processing and normalizes the network 14. RSV 56 sends actions 208 to return all spare capacity to its original state, so as to be available for implementing restoration routes.

When the outage has been cleared, the operational mode parameter is changed back to "ready", RSV 56 detects this in the system logicals 254, and RSV 56 may resume verification processing.

Figure 13:
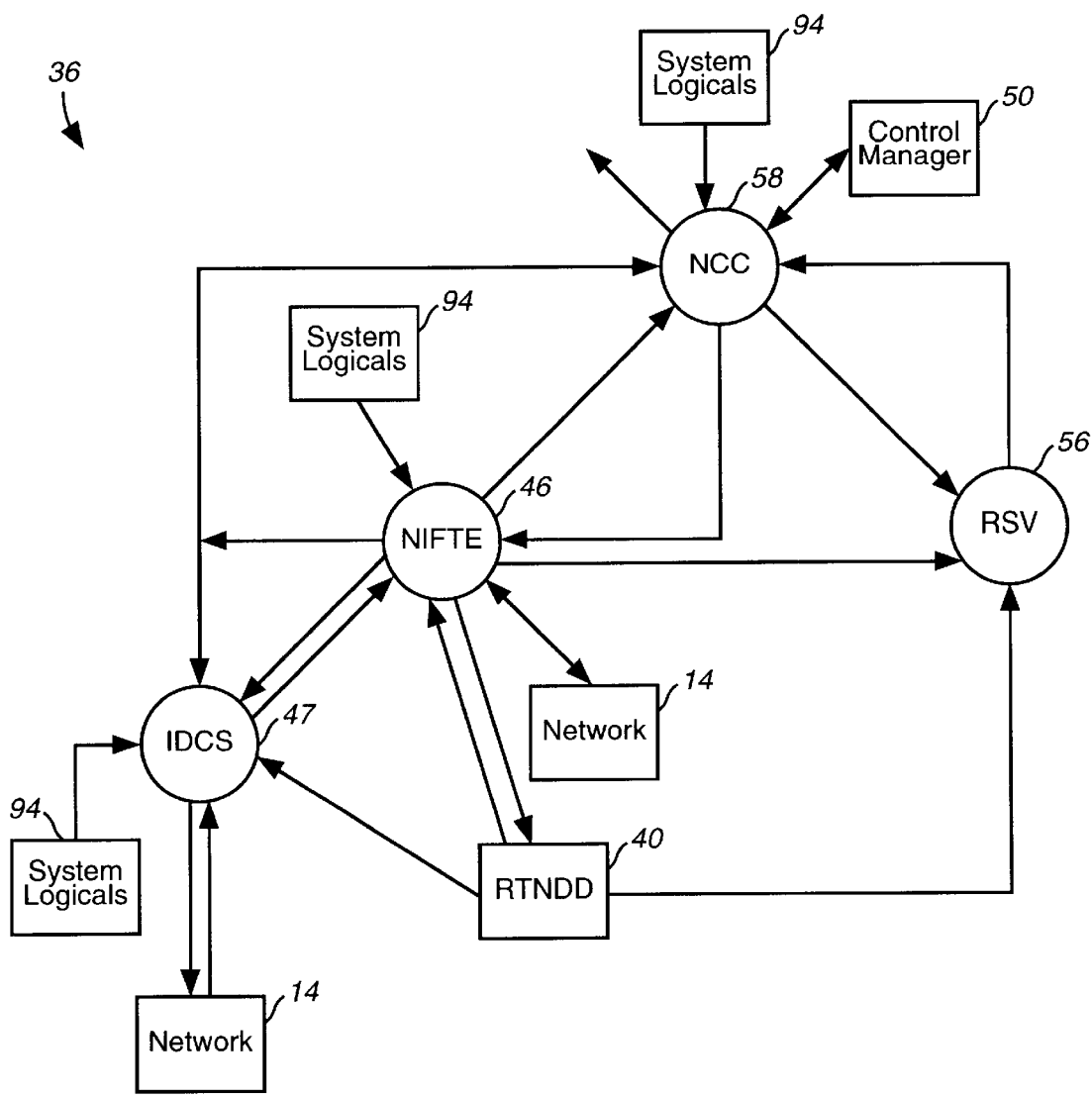
FIG. 13 is a block diagram of a network control component of a network restoration system of the present invention.

FIG. 13 illustrates in detail the logical architecture of network control 36. Network control 36 consists of four primary components, NCC 58, NIFTE 46, RSV 56, and IDCS 47.

The NCC 58 serves as the main interface to and control for network control 36. NCC 58 is responsible for initiating the processing of the other components. In particular, NCC 58 initiates a distinct instance of a NIFTE 46 for each DXC 12 connection. NCC 58 also determines the current readiness mode of the RTR 10, and acts accordingly. When the RTR 10 readiness mode changes from "ready" to "alert", the NCC 58 sends messages to the other components to terminate automatic device audits and topology data updates.

The NCC 58 distributes messages to individual NIFTE 46. However, for the sake of quick performance in the event of an outage, the action dispatcher 70 can send messages directly to the mailboxes of individual NIFTE 46 processes.

The NIFTEs 46 are the interface to the DXCs 12. There is a distinct NIFTE 46 that runs for each DXC 12 that is controlled by RTR 10. NIFTE 46 take action commands from the action dispatcher 70 that are in a generic, internal format. The use of a generic internal format shields the other components of RTR 10 from having to know the specific type of DXC 12 that is at each site. The NIFTE 46 queries the RTNDD 40 with a generic specification of a DXC 12. The RTNDD 40 returns with the specific format to the command needed, which depends on the type of DXC 12 in place. It also returns with the network address of the DXC 12.

The NIFTE 46 can also receive action commands from external control systems 16. These commands are received by the control manager 50, and the control manager 50 sends them either directly to the specific NIFTEs 46, or to the NCC 58. The NIFTEs 46 also manages the communications links with the DXCs 12. These include dual redundant binary data links to each DXC 12 via the network 14, as well as communications over a backup communications network 26.

The IDCS 47 provides the communications interface with the Backup Communications network 26.

As explained above, the RSV 56 component performs an auxiliary function of the RTR 10. It solicits alarms from spare trunk segments in the network 14. When alarms are received, RSV 56 can determine how these trunks are connected. An alarm is generated by a port, and specifies whether that port is internally cross-connected to another port on the same device. Additionally, by comparing alarms from different ports on different devices, RSV 56 can determine if a port on one device is connected to a port on another device, to determine inter-connectivity.

RSV 56 then compares the topology it has determined from alarms with the topology that is reflected in the RTNDD 40. If the derived topology data for a spare is inconsistent with what is reflected in RTNDD 40, RSV 56 will mark the spare as unavailable for restoral routes. This prevents the route generator 68 from attempting to use the spare in a restoral route, which would most likely result in a failed route implementation since the actual connectivity of that spare is different from what the route generator 68 would assume.

Network control 36 uses a partial list of key messages and are described here in detail. For example, a change execution state command may be sent to the NCC 58. The NCC 58 in turn distributes the message to the other components. When change readiness mode command sent to the NCC 58, the NCC 58 distributes the message to the other components. The control manager 50 initiates or terminates, an individual NIFTE 46 process for a single DXC 12 by sending a message to NCC 58. A NCC force audit command may be sent to the NCC 58 by the control manager 50. The NCC 58 passes the message, translated as a NIFTE 46 force audit command, to the NIFTE 46. This command may be provided by an external control system 16, and instructs network control 36 to initiate an audit of one or more DXCs 12. This audit is performed by the NIFTE 46. A NIFTE alarm registration command may be sent to the NIFTE 46 by any number of systems, including external systems via the control manager 50 instructing the NIFTE 46 to send unsolicited DXC 12 alarms to the specified client. The break isolator 66 is a primary such client. A NIFTE port connect command and NIFTE port disconnect command are issued by the action dispatcher 70 to individual NIFTEs 46. They specify port connect and disconnect actions in a generic format. The NIFTE 46 queries the RTNDD 40 to translate these commands to a format that is specific to the DXC 12 that particular NIFTE 46 supports.

A NIFTE 46 data update command is issued to the NIFTE 46 from any number of systems, including internal RTR 10 components, and requests a specific data update to be made to the RTNDD 40, to be performed by the NIFTE 46. A NIFTE data request command is issued to the NIFTE 46 from any number of systems, including internal RTR 10 components, and requests a specific data read from the RTNDD 40, to be performed by the NIFTE 46. An IDCS gateway command is issued by the NIFTE 46 to the IDCS gateway interface 47 to send a command to a DXC 12 using the backup communications network 26. A binary device command is a command issued to a DXC 12 by the NIFTE 46, using the DXC's 12 binary data links accessed by network 14.

A binary device data command is a message sent by a DXC 12 to a NIFTE 46 over the network 14, and includes either a response to a command, a response to an audit, or an unsolicited alarm.

An IDCS message command is issued to a DXC 12 by the NIFTE 46, using the backup communications network 26 via the IDCS 47. An IDCS response is a message sent by a DXC 12 to a NIFTE 46 over the backup communications network 26, and includes either a response to a command, a response to an audit, or an unsolicited alarm.

Figure 14:
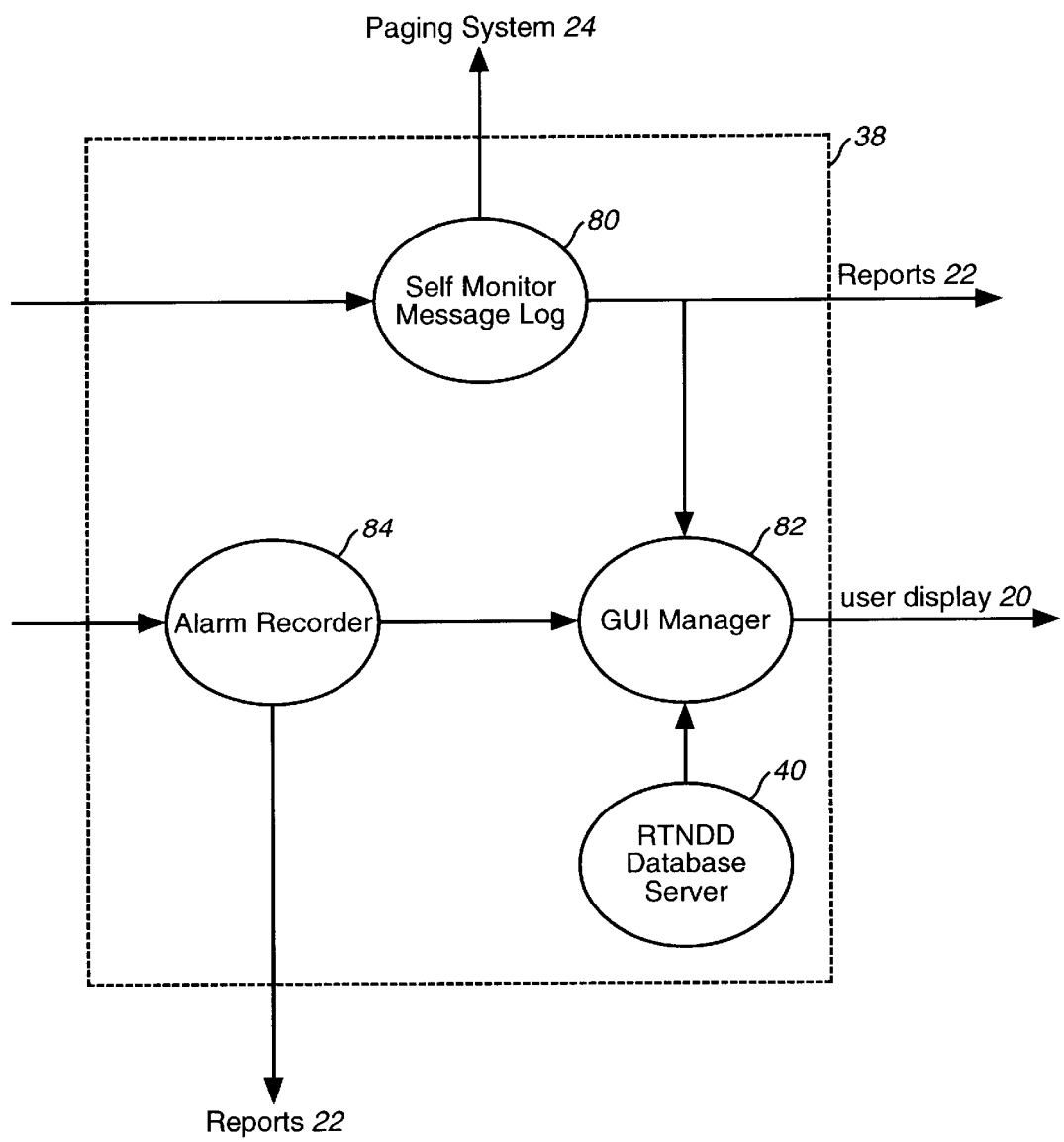
FIG. 14 is a block diagram of a reporting component of a network restoration system of the present invention.

FIG. 14 illustrates the logical architecture of the reporting 38 component. Reporting 38 consists of a self monitor message log 80, which receives error and status messages from each of the other RTR 10 components. These messages are stored in a log file. They can be made available for hard copy and soft copy reports 22. They can also be provided to a GUI manager 82 for output to a user display 20. These messages can also be match to certain thresholds and message type detectors. If a message of a certain type, or messages that exceed a certain threshold, are detected, a notification to a paging system 24 can be made so as to page the appropriate support personnel.

Reporting 38 also consists of an alarm recorder 84. All alarms received by RTR 10 via network control 36 are recorded in an internal list by the alarm recorder 84. This list can be provided to various reports 22, and to a user display 20 via a GUI manager 82. The GUI manager 82 formats and drives output to a user display 20. The GUI manager 82 can be used to output formatted data from the RTNDD 40. A database server process is incorporated into reporting 38 to provide the GUI manager 82 with RTNDD 40 data.

Therefore, the system and method disclosed herein have inherent advantages over the prior art. While certain embodiments of the invention have been illustrated for the purposes of this disclosure, numerous changes in the arrangement and construction of the parts may be made by those skilled in the art, such changes being embodied within the scope and spirit of the present invention as defined by the appended claims.

What is claimed is:

1. A system for monitoring spare capacity in a communications network that includes switching elements, comprising:
    a database within the communications network; and
    a control computer, configured for:
        receiving an alarm from one of the switching elements in response to a generated command to the one switching element, the generated command being at least one of a connect command and a disconnect command;
        determining whether the received alarm indicates an outage in the communications network; and
        updating the database to include the configuration of switching elements to reflect the spare capacity including switching elements not affected by the outage if the alarm is determined to indicate the outage in the communications network.

2. The system as recited in claim 1, wherein the control computer is further configured for generating a command to clear the received alarm.

3. The system as recited in claim 2, wherein in the control computer is further configured for updating the database to reflect said spare capacity based on clearing the received alarm.

4. The system as recited in claim 2, wherein the control computer is further configured for building a database of alarms received from the switching elements.

5. The system as recited in claim 4, wherein the control computer is further configured for determining whether the alarm indicates an outage based on a number of alarms received in a time interval.

6. The system as recited in claim 4, wherein the control computer is further configured for updating the database containing the configuration of switching elements based on information included in the database of alarms.

7. A method of monitoring spare capacity in a communications network, comprising the steps of:
    receiving an alarm from one of the switching elements in response to a generated command to the one switching element, the generated command being at least one of a connect command and a disconnect command;
    determining whether the received alarm indicates an outage in the communications network; and
    updating a database including the configuration of switching elements to reflect the spare capacity including switching elements not affected by the outage if the received alarm is determined to indicate the outage in the communications network.

8. The method as recited in claim 7, further including the step of generating a command to clear the received alarm.

9. The method as recited in claim 8, wherein the control computer is further configured for updating the database to reflect said spare capacity based on clearing the received alarm.

10. The method as recited in claim 7, further including the step of building a database of alarms received from the switching elements.

11. The method as recited in claim 10, further including the step of updating the database containing the configuration of switching elements based on information included in the database of alarms.

12. A system for monitoring spare capacity in a communications network, comprising:
    a database within the communication network: and
    a control computer, configured for:
        receiving an alarm from one of the switching elements in response to a generated command to the one switching element the generated command being at least one of a connect command and a disconnect command;
        generating a command to clear the alarm from said one of the switching elements, said alarm indicating an outage in the communications network,
        building a database of alarms received from the switching elements, said alarms including the received alarm, and
        updating said database including the configuration of the switching elements to reflect spare capacity including switching elements not affect by the outage based upon information in the database of alarms.

13. The system as recited in claim 12, wherein the control computer is further configured for updating said database to reflect the spare capacity based on clearing the alarm.

14. The system as recited in claim 12, wherein the control computer is further configured for generating another on said one of the switching elements and for generating another command to clear the other alarm.

15. The system as recited in claim 12, wherein the control computer is further configured for determining whether the alarm indicates an outage based on a number of alarms received in a time interval.

16. The system as recited in claim 12, wherein the control computer is further configured for updating the database containing the configuration of switching elements based on information included in the database of alarms.

17. A memory device bearing instructions for monitoring spare capacity in a communications network, said instructions arranged, upon execution, to cause a control computer to perform the steps of the method as recited in claim 7.

18. A system for monitoring spare capacity in a communications network, comprising:
    a database including the configuration of switching elements within the communications network; and
    a control computer, configured for:
        generating at least one of a connect command and a disconnect commands to cause one of the switching elements to generate an alarm;
        receiving the alarm from said one of the switching elements, and updating the database to reflect the spare capacity.

19. A method of monitoring spare capacity in a communications network including a plurality of switching elements, said method comprising:
    generating at least one of a connect command and a disconnect commands to cause one of the switching elements to generate an alarm;
    receiving the alarm from said one of the switching elements, and updating a database including the configuration of the switching elements to reflect the spare capacity.

20. A memory device bearing instructions for monitoring spare capacity in a communications network, said instructions arranged, upon execution, to cause a control computer to perform the steps of the method as recited in claim 19.

21. A method of maintaining spare capacity information of a communications system including a plurality of switching elements, the method comprising:
    generating a command to trigger an alarm from a port of one of the plurality of switching elements interconnected by spare segments; and
    analyzing the alarm received from the port of the one switching element to determine topology of the spare segments,
    wherein a database containing information on availability of the spare segments is updated based on the analyzed alarm.

* * * * *